(12) United States Patent
Jeong et al.

(10) Patent No.: US 12,498,881 B2
(45) Date of Patent: Dec. 16, 2025

(54) STORAGE DEVICE AND OPERATING METHOD THEREOF

(71) Applicant: Samsung Electronics Co., Ltd., Suwon-si (KR)

(72) Inventors: Wookhan Jeong, Pocheon-si (KR); Semi Kim, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 354 days.

(21) Appl. No.: 17/831,920

(22) Filed: Jun. 3, 2022

(65) Prior Publication Data

US 2023/0043925 A1 Feb. 9, 2023

(30) Foreign Application Priority Data

Jul. 22, 2021 (KR) .................. 10-2021-0096711
Apr. 1, 2022 (KR) .................. 10-2022-0041332

(51) Int. Cl.
| | | |
|---|---|---|
| *G06F 11/00* | (2006.01) | |
| *G06F 3/06* | (2006.01) | |
| *G06F 11/34* | (2006.01) | |

(52) U.S. Cl.
CPC .......... *G06F 3/0656* (2013.01); *G06F 3/0604* (2013.01); *G06F 3/0679* (2013.01); *G06F 11/3476* (2013.01)

(58) Field of Classification Search
CPC ............. G06F 11/3476; G06F 2201/86; G06F 11/3037; G06F 11/0727
See application file for complete search history.

(56) References Cited

U.S. PATENT DOCUMENTS 8,966,319 B2 2/2015 Fai et al.
9,639,287 B1 * 5/2017 Malina .................... G06F 3/068
(Continued)

FOREIGN PATENT DOCUMENTS

KR 10-2019-0041331 A 4/2019
KR 10-2019-0088659 A 7/2019

OTHER PUBLICATIONS

Extended European Search Report dated Dec. 1, 2022 for corresponding European Application No. 22177175.1.

*Primary Examiner* — Amine Riad
(74) *Attorney, Agent, or Firm* — Harness, Dickey & Pierce, P.L.C.

(57) ABSTRACT

A storage device and an operating method thereof are provided. The storage device includes a non-volatile memory, an interconnect, a device controller and a buffer memory. The interconnect exchanges data with a host, receives a logging target setting request and a logging period setting request with respect to debugging information from the host, receives a debugging information logging request from the host, and receive a read request from the host. The device controller includes a buffer memory and controls the non-volatile memory, controls a logging operation on the debugging information based on a logging target and a logging period, which are requested by the host, in response to the debugging information logging request, and transmits the debugging information to the host in response to the read request. The device controller is further configured to logs the debugging information in the buffer memory according to the debugging information logging request.

20 Claims, 22 Drawing Sheets

(56) References Cited

U.S. PATENT DOCUMENTS

| | | | |
|---|---|---|---|
| 9,690,642 B2* | 6/2017 | Anderson | G06F 11/0778 |
| 9,824,777 B2* | 11/2017 | Mun | G11C 29/789 |
| 9,875,170 B2* | 1/2018 | Kim | G06F 11/07 |
| 10,089,212 B2 | 10/2018 | Iwai | |
| 10,176,029 B2 | 1/2019 | Choi et al. | |
| 10,474,618 B2 | 11/2019 | Anderson et al. | |
| 10,761,969 B2 | 9/2020 | Jung et al. | |
| 10,776,044 B2* | 9/2020 | Hayashi | G06F 3/0614 |
| 10,817,405 B2 | 10/2020 | Kim | |
| 10,942,800 B2 | 3/2021 | Yun et al. | |
| 11,093,349 B2* | 8/2021 | Carpenter | G06F 11/3476 |
| 11,620,084 B2* | 4/2023 | Kim | G06F 3/0604 |
| | | | 711/103 |
| 2018/0138090 A1* | 5/2018 | Go | G11C 16/0483 |
| 2019/0095271 A1* | 3/2019 | Lemberg | G06F 11/073 |
| 2019/0179694 A1* | 6/2019 | Park | G06F 11/0787 |
| 2020/0004431 A1* | 1/2020 | Chiang | G06F 3/0653 |
| 2020/0125437 A1 | 4/2020 | Kataria et al. | |
| 2021/0019218 A1 | 1/2021 | Zhu et al. | |
| 2022/0100408 A1* | 3/2022 | Fu | G06F 3/0619 |
| 2022/0206713 A1* | 6/2022 | Kim | G06F 12/10 |

\* cited by examiner

STORAGE DEVICE AND OPERATING METHOD THEREOF

CROSS-REFERENCE TO RELATED APPLICATIONS

This application is based on and claims priority under 35 U.S.C. § 119 to Korean Patent Application Nos. 10-2021-0096711, filed on Jul. 22, 2021 and 10-2022-0041332, filed on Apr. 1, 2022, in the Korean Intellectual Property Office, the disclosures of which are incorporated by reference herein in their entireties.

BACKGROUND

The inventive concepts relate to a memory device, and more particularly, to a storage device, an operating method of the storage device, a host, and an operating method of the host.

A storage system includes a host and a storage device. The host is connected to the storage device through various standard interfaces, such as a universal flash storage (UFS) interface, a serial advanced technology attachment (SATA) interface, a small computer small interface (SCSI), serial attached SCSI (SAS), and an embedded multimedia card (eMMC) interface. When an error occurs in relation with the storage device, the host may perform debugging. At this time, it may be hard for the host to perform smooth debugging only with limited debugging information of the storage device.

SUMMARY

The inventive concepts provide a storage device capable of logging debugging information with respect to a target and a period, which are set by a host, and an operating method of the storage device.

The inventive concepts also provide a host capable of setting a logging target and a logging period with respect to debugging information stored by a storage device and an operating method of the host.

According to an example embodiment of the inventive concepts, there is provided a storage device including a non-volatile memory; an interconnect configured to exchange data with a host, receive a logging target setting request and a logging period setting request with respect to debugging information from the host, receive a debugging information logging request from the host, and receive a read request from the host; and a device controller including a buffer memory, the device controller configured to control the non-volatile memory to write the data thereto or read the data therefrom, control a logging operation on the debugging information based on a logging target and a logging period, which are requested by the host, in response to the debugging information logging request, and transmit the debugging information to the host in response to the read request. The device controller is further configured to log the debugging information in the buffer memory according to the debugging information logging request.

According to another example embodiment of the inventive concepts, there is provided an operating method of a storage device. The operating method includes receiving a debugging information logging request from a host, the debugging information logging request requesting to start a command history record operation; starting a debugging information logging operation with respect to a command history record in response to the debugging information logging request; receiving a command from the host; logging the command history record in a buffer memory of the storage device in response to the command; receiving a read request from the host; and transmitting the command history record to the host in response to the read request.

According to a further example embodiment of the inventive concepts, there is provided an operating method of a storage device. The operating method includes receiving a logging target setting request and a logging period setting request from a host; setting a logging target and a logging period in response to the logging target setting request and the logging period setting request; receiving a debugging information logging request from the host, the debugging information logging request starting a device status record operation; controlling a debugging information logging operation with respect to a device status record in response to the debugging information logging request; receiving a read request from the host; and transmitting the device status record to the host in response to the read request.

BRIEF DESCRIPTION OF THE DRAWINGS

Example embodiments of the inventive concepts will be more clearly understood from the following detailed description taken in conjunction with the accompanying drawings in which.

DETAILED DESCRIPTION OF THE EXAMPLE EMBODIMENTS

Hereinafter, example embodiments will be described in detail with reference to the accompanying drawings.

Figure 1:
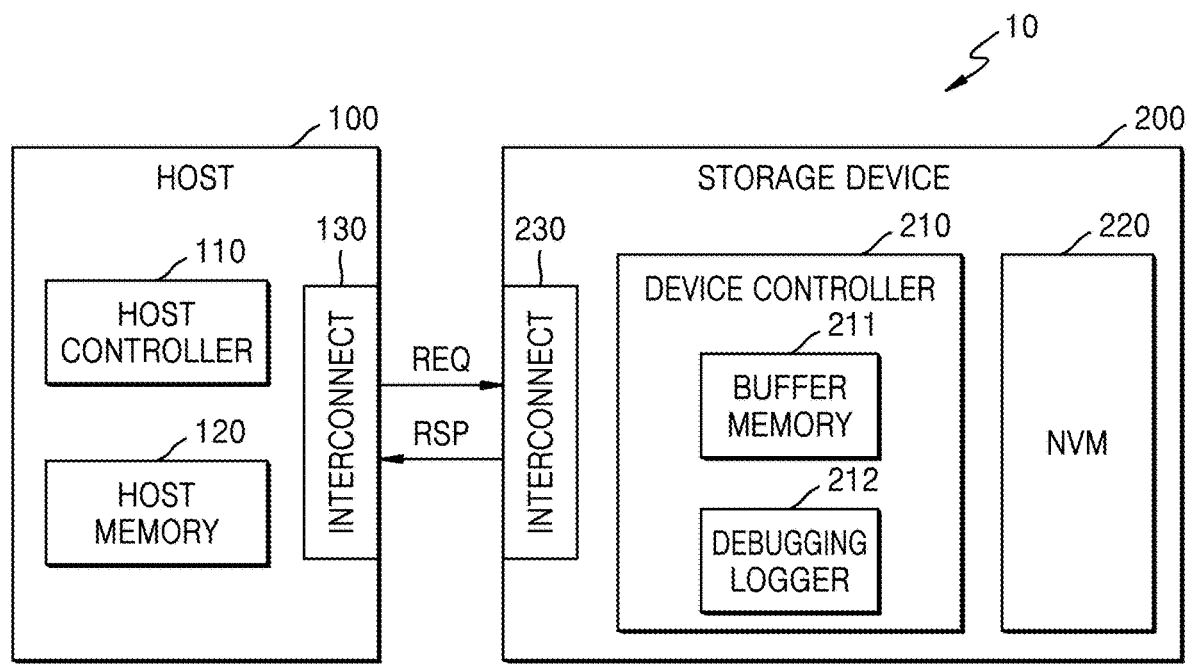
FIG. 1 is a block diagram of a storage system according to an example embodiment.

FIG. 1 is a block diagram of a storage system 10 according to an example embodiment. Referring to FIG. 1, the storage system 10 includes a host 100 and a storage device 200. For example, the host 100 may be connected to the storage device 200 according to an interface protocol defined in universal flash storage (UFS) standards, and accordingly, the host 100 may include a UFS host and the storage device 200 may include a UFS device. However, example embodiments are not limited thereto, and the host 100 may be connected to the storage device 200 according to various standard interfaces.

The host 100 may control a data processing operation, e.g., a data read operation or a data write operation, with respect to the storage device 200. The host 100 may refer to a data processing device, such as a central processing unit (CPU), a processor, a microprocessor, or an application processor (AP), which may process data. The host 100 may execute an operating system (OS) and/or various applications. In an example embodiment, the storage system 10 may be included in a mobile device, and the host 100 may be implemented as an AP. In an example embodiment, the host 100 may be implemented as a system-on-a-chip (SoC).

The host 100 may include a host controller 110, a host memory 120, and an interconnect 130. The host memory 120 may function as a buffer memory that temporarily stores data to be transmitted to the storage device 200 or data transmitted from the storage device 200. The interconnect 130 may provide an interface for data exchange between the host 100 and the storage device 200. The host 100 may transmit a request REQ to the storage device 200 through the interconnect 130 and receive a response RSP from the storage device 200 through the interconnect 130. For example, when the request REQ is a write request, the request REQ may include write data. For example, when the request REQ is a read request, the response RSP to the request REQ may include read data.

A storage device usually generates, as a snapshot, device specific debugging information regarding hardware or software information thereof. Such device specific debugging information may be often used in a debugging device, such as a separate hardware module. However, even if a host receives debugging information from a storage device, it is hard for the host to effectively use the debugging information for a debugging operation. Accordingly, even when an error occurs in a storage device, it may be hard for a host to analyze debugging information and perform a debugging operation.

However, according to example embodiments, the host 100 may set a logging target and a logging period with respect to debugging information to be stored in the storage device 200 and send a debugging information logging request to the storage device 200, and the storage device 200 may generate the debugging information by logging the logging target set by the host 100 in the logging period set by the host 100. When necessary, the host 100 may smoothly perform a debugging operation by querying for the debugging information stored in the storage device 200. Accordingly, the host 100 may determine a history before the time when an error occurs and manage a similar situation by analyzing desired debugging information when the error occurs. Specific operations of the host 100 and the storage device 200 are described below.

The host 100 may transmit, to the storage device 200, the request REQ for querying for a first descriptor stored in the storage device 200 and determine whether the storage device 200 supports a logging feature for particular debugging information, based on the response RSP received from the storage device 200. The host 100 may transmit, to the storage device 200, the request REQ for querying for a second descriptor stored in the storage device 200 and determine a maximum logging size of particular debugging information in the storage device 200, i.e., a maximum size of a buffer storing the particular debugging information, based on the response RSP received from the storage device 200. For example, the host 100 may transmit the request REQ for querying for the first or second descriptor to the storage device 200 in an initialization or idle period of the storage device 200.

The host 100 may set a logging target and a logging time or period with respect to debugging information and transmit the request REQ, which includes the set logging target and the set logging time or period, to the storage device 200. Thereafter, the host 100 may transmit, to the storage device 200, the request REQ instructing to start a debugging information logging operation. Thereafter, the host 100 may transmit, to the storage device 200, the request REQ for querying for debugging information. The host 100 may hereby receive debugging information from the storage device 200 when the debugging information is necessary, even though a particular event does not occur.

In an example embodiment, when the host 100 is a UFS host and the storage device 200 is a UFS device, the host 100 may transmit the request REQ for querying for the first descriptor, the request REQ for querying for the second descriptor, the request REQ including a logging target and a logging time or period, and the request REQ instructing to start a debugging information logging operation, as a query request or a query request UFS protocol information unit (UPIU), to the storage device 200. Here, the UPIU is a unit exchanged between a UFS transport protocol (UTP) layer of the host 100 and a UTP layer of the storage device 200. A UTP of the host 100 receives a request from an application layer or a device manager, generates a UPIU with respect to the request, and transmits the UPIU to a peer UTP of the storage device 200.

Here, the query request may be used to read or write parameter data regarding the storage device 200 and to obtain information about the configuration of the storage device 200. In detail, the query request may be used between the host 100 and the storage device 200 to set or write data structures, such as a descriptor, an attribute, a flag, system data, configuration data, and production information.

A descriptor corresponds to a page or block of parameters describing configuration related information of the storage device 200. For example, there are device descriptors, configuration descriptors, unit descriptors, and so on. An attribute corresponds to a parameter indicating a certain range of numeric values that may be set or read by the storage device 200. For example, a block size may be an attribute. The flag corresponds to a single Boolean value indicating "true" or "false", or "0" or "1". A flag may be used to enable or disable a certain feature, mode, or status of the storage device 200.

The storage device 200 may include a device controller 210, a non-volatile memory (NVM) 220, and an interconnect 230. The device controller 210 may include a buffer memory 211 and a debugging logger 212. The interconnect 230 may provide an interface for data exchange between the host 100 and the storage device 200. The storage device 200 may receive the request REQ from the host 100 through the interconnect 230 and transmit the response RSP to the host 100 through the interconnect 230. For example, when the request REQ is a write request, the device controller 210 may control the NVM 220 to write data thereto in response to the write request of the host 100. For example, when the request REQ is a read request, the device controller 210 may control the NVM 220 to read data therefrom in response to the read request of the host 100.

The storage device 200 may store a plurality of descriptors including the first descriptor and the second descriptor in the NVM 220 or the buffer memory 211. Here, a descriptor corresponds to a page or block of parameters related to the storage device 200. For example, the first descriptor may correspond to a device descriptor, and the second descriptor may correspond to a geometry descriptor. However, example embodiments are not limited thereto. For example, some descriptors may be initialized when power is applied to the storage device 200.

In response to the request REQ for querying for the first descriptor, which is received from the host 100, the storage device 200 may transmit, to the host 100, the response RSP including at least part of the first descriptor, e.g., whether a record feature is supported for particular debugging information. Similarly, in response to the request REQ for querying for the second descriptor, which is received from the host 100, the storage device 200 may transmit, to the host 100, the response RSP including at least part of the second descriptor, e.g., a maximum record size of particular debugging information.

In response to the request REQ including a logging target setting request and a logging period setting request, which is received from the host 100, the storage device 200 may identify a logging target and a logging period with respect to debugging information. Thereafter, in response to the request REQ instructing to start a debugging information logging operation, which is received from the host 100, the storage device 200 may start the debugging information logging operation. Thereafter, in response to the request REQ for querying for debugging information, which is received from the host 100, the storage device 200 may transmit logged debugging information to the host 100.

The NVM 220 may store data according to the request REQ of the host 100. When there is an event, such as application of a certain command from the host 100 or device reset, the NVM 220 may back up the logged debugging information to the buffer memory 211. When the NVM 220 includes flash memory, the flash memory may include a two-dimensional (2D) NAND memory array or a three-dimensional (3D) or vertical NAND (VNAND) memory array. The storage device 200 may include various kinds of NVM. For example, magnetic random access memory (MRAM), spin-transfer torque MRAM, conductive bridging RAM (CBRAM), ferroelectric RAM (FeRAM), phase-change RAM (PRAM), resistive RAM, and other various kinds of memory may be used for the storage device 200.

In some example embodiments, the storage device 200 may include a DRAMless device, which may refer to a device that does not include a dynamic RAM (DRAM) cache. At this time, the device controller 210 may not include a DRAM controller. For example, the storage device 200 may use a portion of the NVM 220 as a buffer memory.

In some example embodiments, the storage device 200 may correspond to an internal memory embedded in an electronic device. For example, the storage device 200 may include an embedded UFS memory device, an embedded multimedia card (eMMC), or a solid state drive (SSD). However, example embodiments are not limited thereto. The storage device 200 may correspond to an NVM (e.g., one time programmable read-only memory (OTPROM), programmable ROM (PROM), erasable and programmable ROM (EPROM), electrically erasable and programmable ROM (EEPROM), mask ROM, or flash ROM). In some example embodiments, the storage device 200 may correspond to an external memory removable from an electronic device. For example, the storage device 200 may include at least one selected from a UFS memory card, a compact flash (CF) card, a secure digital (SD) card, a micro-SD card, a mini-SD card, an extreme digital (xD) card, and a memory stick.

The storage system 10 may be implemented as an electronic device, such as a personal computer (PC), a laptop computer, a mobile phone, a smartphone, a tablet PC, a personal digital assistant (PDA), an enterprise digital assistant (EDA), a digital still camera, a digital video camera, an audio device, a portable multimedia player (PMP), a personal navigation device or portable navigation device (PND), an MP3 player, a handheld game console, or an e-book. The storage system 10 may be implemented in various types of electronic devices including a wearable device, such as a watch or a head-mounted display (HMD).

Figure 2:
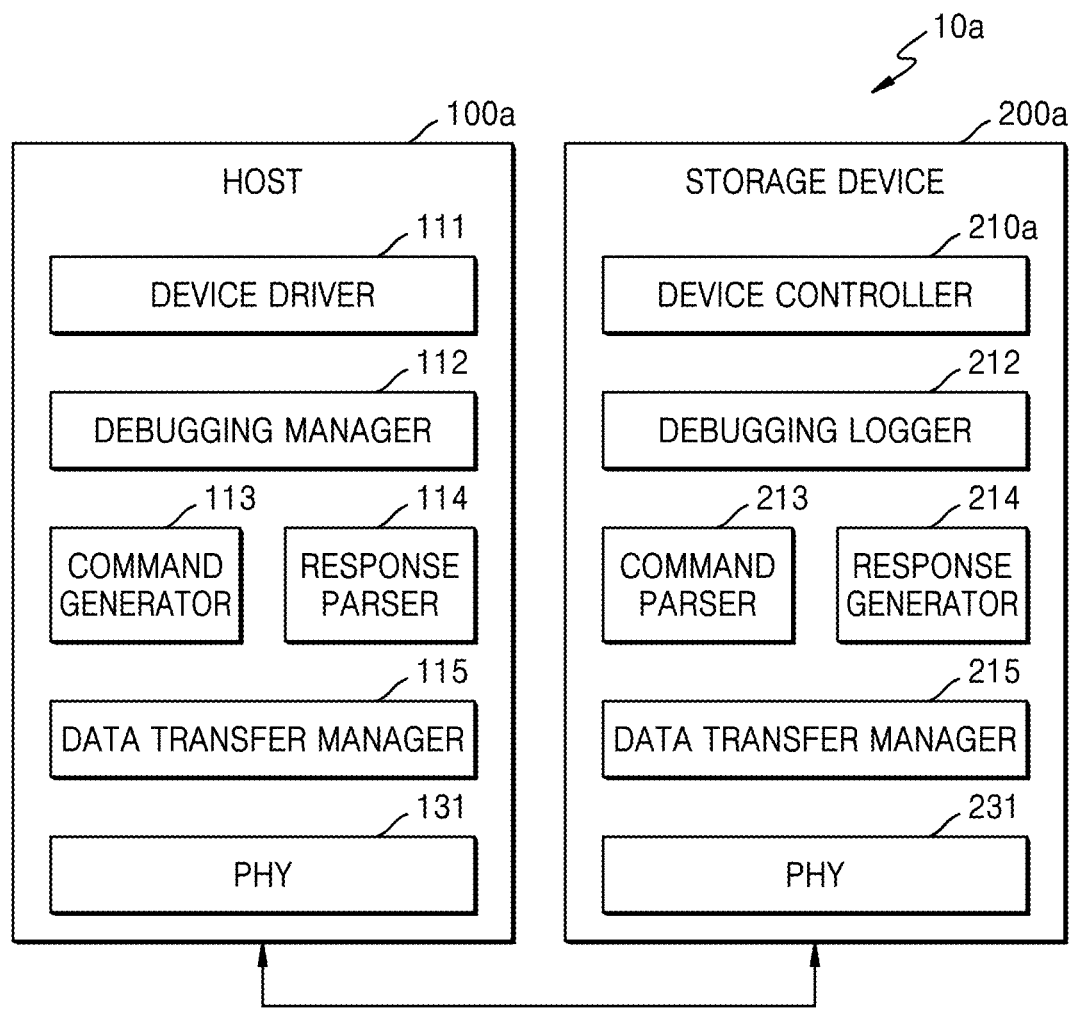
FIG. 2 is a block diagram of a storage system according to an example embodiment.

FIG. 2 is a block diagram of a storage system 10a according to an example embodiment. The storage system 10a may correspond to an example implementation of the storage system 10 of FIG. 1, and the descriptions given above with reference to FIG. 1 may also be applied to the present example embodiment.

Referring to FIG. 2, a host 100a may include a device driver 111, a debugging manager 112, a command generator 113, a response parser 114, a data transfer manager 115, and a physical layer (PHY) 131. In an example embodiment, the device driver 111, the debugging manager 112, the command generator 113, and the response parser 114 may be implemented by software and loaded to the host memory 120 (in FIG. 1), and the host controller 110 (in FIG. 1) may control the operations of the device driver 111, the debugging manager 112, the command generator 113, and the response parser 114 by accessing the host memory 120. However, example embodiments are not limited thereto. In some example embodiments, the device driver 111, the debugging manager 112, the command generator 113, and the response parser 114 may be implemented by hardware or firmware. In an example embodiment, part of the data transfer manager 115 may be implemented by software, and the other part of the data transfer manager 115 may be implemented by hardware. For example, the PHY 131 may be included in the interconnect 130 (in FIG. 1).

The PHY 131 may exchange data with a storage device 200a, transmit a command or a request to the storage device 200a, and receive data or a response from the storage device 200a. For example, the PHY 131 may include at least one transmitter and at least one receiver. The data transfer manager 115 may generate a packet for data to be transmitted to the storage device 200a. The command generator 113 may generate a command to the storage device 200a, and the response parser 114 may interpret or parse a response received from the storage device 200a. The debugging manager 112 may set debugging information to be logged by the storage device 200a and query for the debugging information from the storage device 200a.

The device driver 111 may include a software module of a kernel for controlling the storage device 200a and may control the debugging manager 112, the command generator 113, the response parser 114, the data transfer manager 115 or the PHY 131. For example, the host 100a may include an application for communication with the storage device 200a and communicate with the storage device 200a through the device driver 111. When a read request occurs in the application, the device driver 111 may generate and transmit a read command to the storage device 200a, based on the read request.

The storage device 200a may include a device controller 210a, the debugging logger 212, a command parser 213, a response generator 214, a data transfer manager 215, and a PHY 231. In an example embodiment, the debugging logger 212, the command parser 213, and the response generator 214 may be implemented by software and loaded to a working memory of the storage device 200a. However, example embodiments are not limited thereto. In some example embodiments, the debugging logger 212, the command parser 213, and the response generator 214 may be implemented by hardware or firmware. In an example embodiment, part of the data transfer manager 215 may be implemented by software, and the other part of the data transfer manager 215 may be implemented by hardware. For example, the controller 210 in FIG. 1 may correspond to the device controller 210a. For example, the PHY 231 may be included in the interconnect 230 in FIG. 1.

The PHY 231 may exchange data with the host 100a, receive a command or a request from the host 100a, and transmit data or a response to the host 100a. For example, the PHY 231 may include at least one transmitter and at least one receiver. The data transfer manager 215 may generate a packet for data to be transmitted to the host 100a. The command parser 213 may interpret or parse a command received from the host 100a, and the response generator 214 may generate a response to be transmitted to the host 100a. The debugging logger 212 may log debugging information set by the host 100a. The device controller 210a may generally control the storage device 200a.

Figure 3:
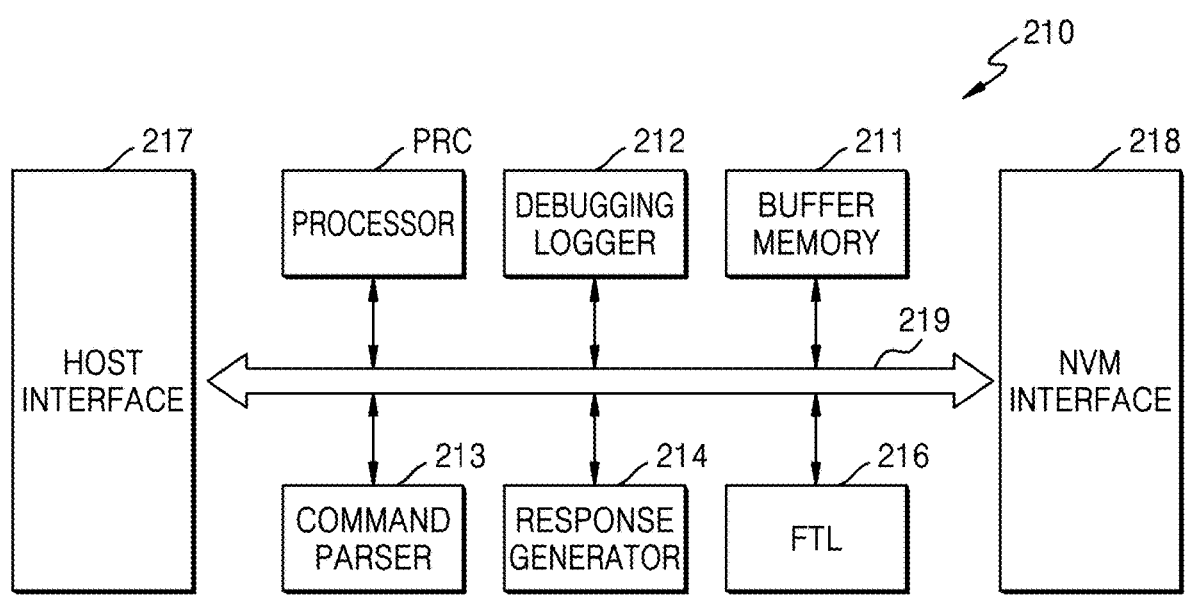
FIG. 3 is a block diagram of a device controller according to an example embodiment.

FIG. 3 is a block diagram of the device controller 210 according to an example embodiment. Referring to FIG. 3, the device controller 210 may include a processor PRC, the buffer memory 211, the debugging logger 212, the command parser 213, the response generator 214, a flash translation layer (FTL) 216, a host interface 217, and an NVM interface 218, which communicate with one another through a bus 219.

Although it is illustrated in FIG. 3 that the device controller 210 includes the command parser 213 and the response generator 214, example embodiments are not limited thereto. In some example embodiments, the command parser 213 and the response generator 214 may be included in the host interface 217. In an example embodiment, the data transfer manager 215 in FIG. 2 may be included in the host interface 217. However, example embodiments are not limited thereto. In some example embodiments, the data transfer manager 215 may be included in the device controller 210. The descriptions given above with reference to FIG. 2 may also be applied to the present example embodiment, and redundant descriptions thereof are omitted. Descriptions are made with reference to FIGS. 1 and 3 below.

The processor PRC may include a CPU or a microprocessor and generally control operations of the device controller 210. In an example embodiment, the processor PRC may be implemented as a multi-core processor, e.g., a dual-core processor or a quad-core processor. The debugging logger 212, the command parser 213, the response generator 214, and the FTL 216 may be loaded to a working memory of the device controller 210. For example, the working memory may include volatile memory, such as static RAM (SRAM) or DRAM, or non-volatile memory, such as flash memory or PRAM.

When the processor PRC executes the debugging logger 212 loaded to the working memory, an operation of logging debugging information in the buffer memory 211 may be controlled. The debugging logger 212 may log debugging information, which corresponds to a logging target and a logging time or period that are set by the host 100, in the buffer memory 211. The buffer memory 211 may also temporarily store data to be written to the NVM 220 or data read from the NVM 220. The buffer memory 211 may be inside or outside the device controller 210.

When the processor PRC executes the FTL 216 loaded to the working memory, data writing or reading operations of the NVM 220 may be controlled. The FTL 216 may perform various functions, such as address mapping, wear leveling, and garbage collection. Address mapping is an operation of translating a logical address received from the host 100 into a physical address used to actually store data in the NVM 220. Wear leveling is technology for preventing excessive degradation of a memory block by allowing memory blocks of the NVM 220 to be uniformly used. For example, the wear leveling may be implemented as a firmware technique for balancing the erase counts of physical blocks. Garbage collection is technology for securing the available capacity of the NVM 220 by copying valid data of an old memory block to a new memory block and erasing the old memory block.

The host interface 217 may exchange packets with the host 100. A packet transmitted from the host 100 to the host interface 217 may include the request REQ, a command, data to be written to the NVM 220, or the like. A packet transmitted from the host interface 217 to the host 100 may include the response RSP to a command, data read from the NVM 220, or the like. The NVM interface 218 may transmit, to the NVM 220, data to be written to the NVM 220 or receive data read from the NVM 220. The NVM interface 218 may be implemented to comply with a standard, such as Toggle or open NAND flash interface (ONFI).

As is shown in FIGS. 1-3, the storage device 200 may be implemented as a combination of interconnecting hardware (such as the interconnect 230, PHY 231, and Host interface 217), memory hardware (such as buffer memory 211, and NVM 220), and processing circuitry (including device controller 210a, debugging logger 212, command parser 213, response generator 214, data transfer manager 215, processor PRC, FTL 216).

Figure 4:
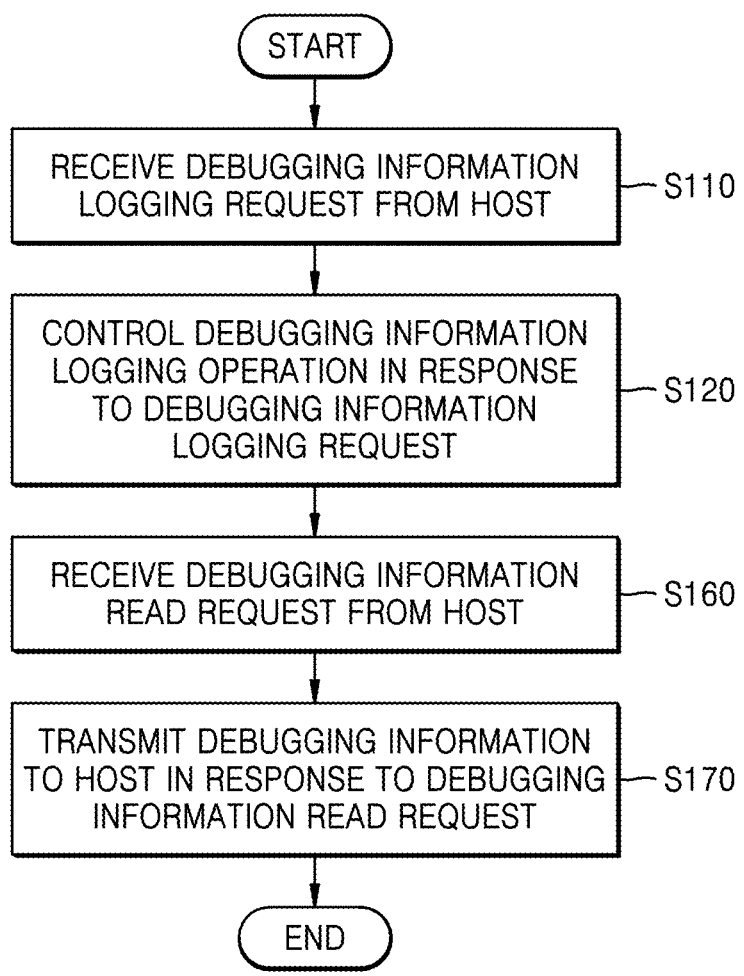
FIG. 4 is a flowchart of an operating method of a storage device, according to an example embodiment.

FIG. 4 is a flowchart of an operating method of a storage device, according to an example embodiment. Referring to FIG. 4, the operating method of a storage device, according to the present example embodiment, corresponds to a debugging information logging method of a storage device and may include, for example, operations time-sequentially performed by the storage device 200 in FIG. 1 or the storage device 200a in FIG. 2. The descriptions given above with reference to FIGS. 1 to 3 may also be applied to the present example embodiment, and redundant descriptions thereof are omitted.

The storage device 200 may receive a debugging information logging request from the host 100 in operation S110. The storage device 200 may control a debugging information logging operation in response to the debugging information logging request in operation S120. The storage device 200 may receive a debugging information read request from the host 100 in operation S160. The storage device 200 may transmit debugging information to the host 100 in response to the debugging information read request in operation S170.

Figure 5:
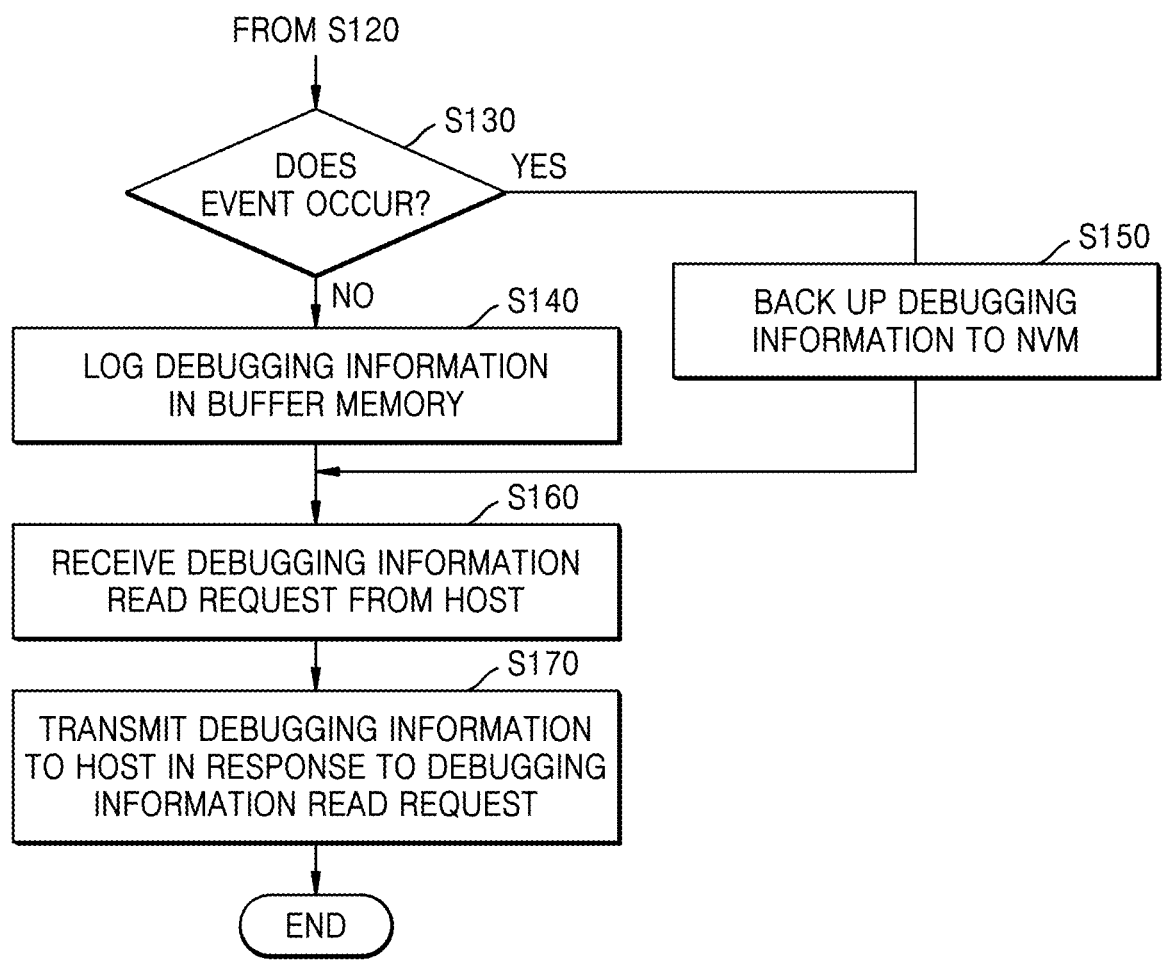
FIG. 5 is a flowchart of an operating method of a storage device, according to an example embodiment.

FIG. 5 is a flowchart of an operating method of a storage device, according to an example embodiment. Referring to FIG. 5, the operating method of a storage device, according to the present example embodiment, corresponds to a modification of the operating method of FIG. 4. The descriptions given above with reference to FIG. 4 may also be applied to the present example embodiment, and redundant descriptions thereof are omitted.

The storage device 200 may determine whether an event occurs in operation S130. For example, an event may include reception of a task abort request from the host 100. For example, an event may include a reset of the storage device 200. When no event occurs, the storage device 200 may log debugging information in the buffer memory 211 in operation S140. Otherwise, when an event occurs, the storage device 200 may back up the debugging information to the NVM 220 in operation S150.

The storage device 200 may receive the debugging information read request from the host 100 in operation S160. The storage device 200 may transmit the debugging information to the host 100 in response to the debugging information read request in operation S170.

Figure 6:
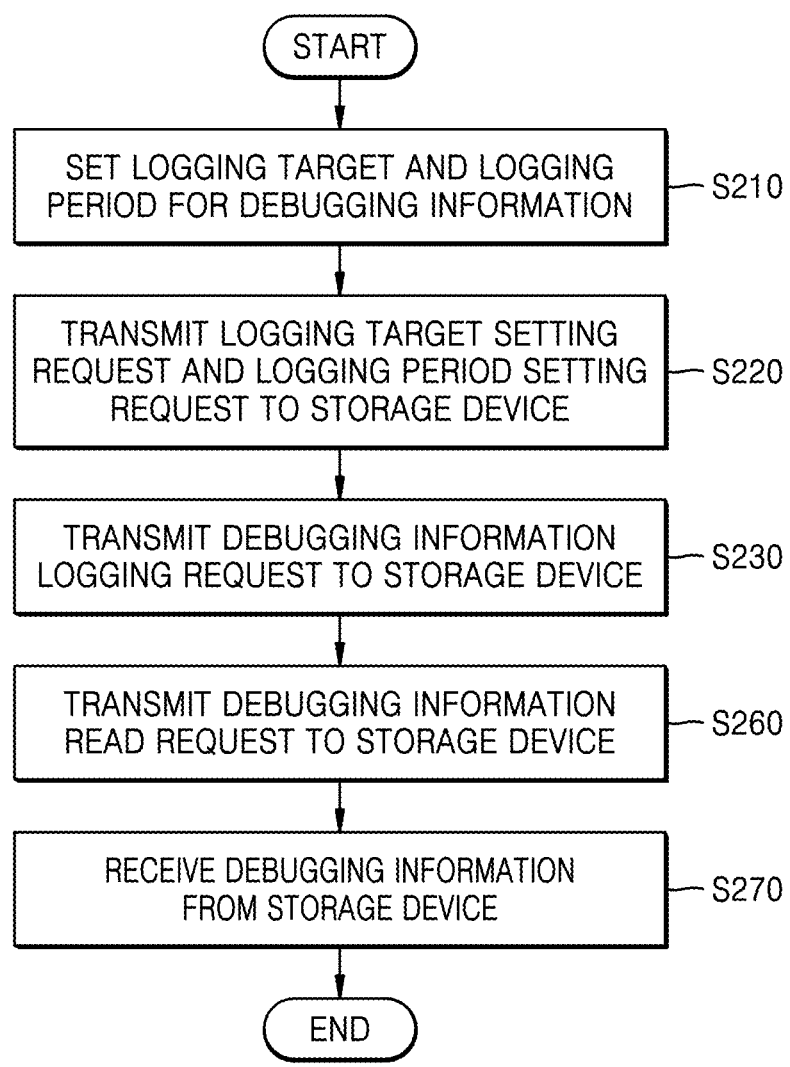
FIG. 6 is a flowchart of an operating method of a host, according to an example embodiment.

FIG. 6 is a flowchart of an operating method of a host, according to an example embodiment. Referring to FIG. 6, the operating method of a host, according to the present example embodiment, corresponds to a debugging information logging method using a storage device and may include, for example, operations time-sequentially performed by the host 100 in FIG. 1 or the host 100a in FIG. 2. The descriptions given above with reference to FIGS. 1 to 3 may also be applied to the present example embodiment, and redundant descriptions thereof are omitted.

The host 100 may set a logging target and a logging period for debugging information in operation S210. The host 100 may transmit a logging target setting request and a logging period setting request to the storage device 200 in operation S220. The host 100 may transmit a debugging information logging request to the storage device 200 in operation S230. The host 100 may transmit a debugging information read request to the storage device 200 in operation S260. The host 100 may receive debugging information from the storage device 200 in operation S270.

Figure 7:
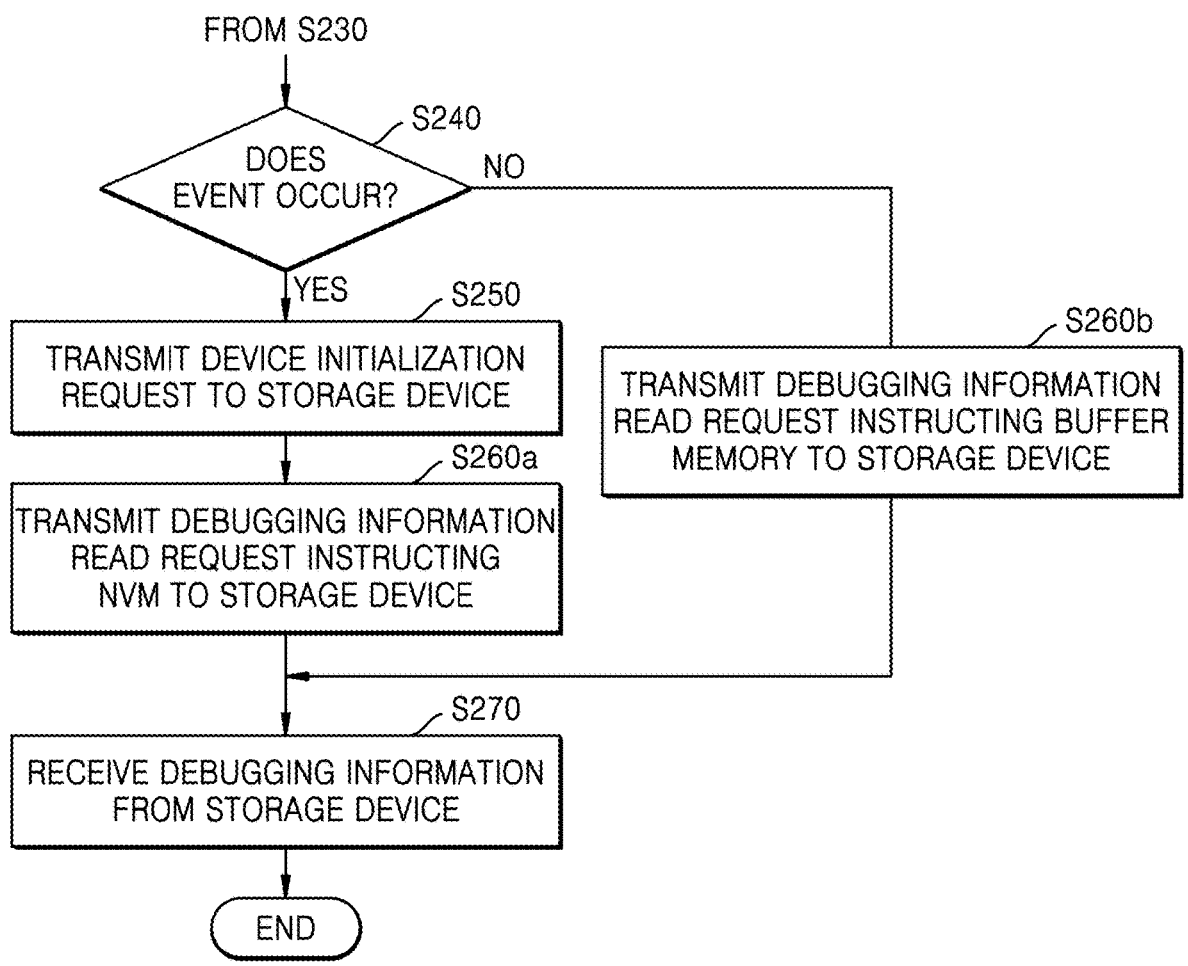
FIG. 7 is a flowchart of an operating method of a host, according to an example embodiment.

FIG. 7 is a flowchart of an operating method of a host, according to an example embodiment. Referring to FIG. 7, the operating method of a host, according to the present example embodiment, corresponds to a modification of the operating method of FIG. 6. The descriptions given above with reference to FIG. 6 may also be applied to the present example embodiment, and redundant descriptions thereof are omitted.

The host 100 may determine whether an event occurs in operation S240. For example, an event may include transmission of a task abort request to the storage device 200. For example, an event may include a reset of the storage device 200. When an event occurs, the host 100 may transmit a device initialization request to the storage device 200 in operation S250. The host 100 may transmit the debugging information read request instructing the NVM 220 to the storage device 200 in operation S260a. Otherwise, when no event occurs, the host 100 may transmit the debugging information read request instructing the buffer memory 211 to the storage device 200 in operation S260b. The host 100 may receive the debugging information from the storage device 200 in operation S270.

Figure 8:
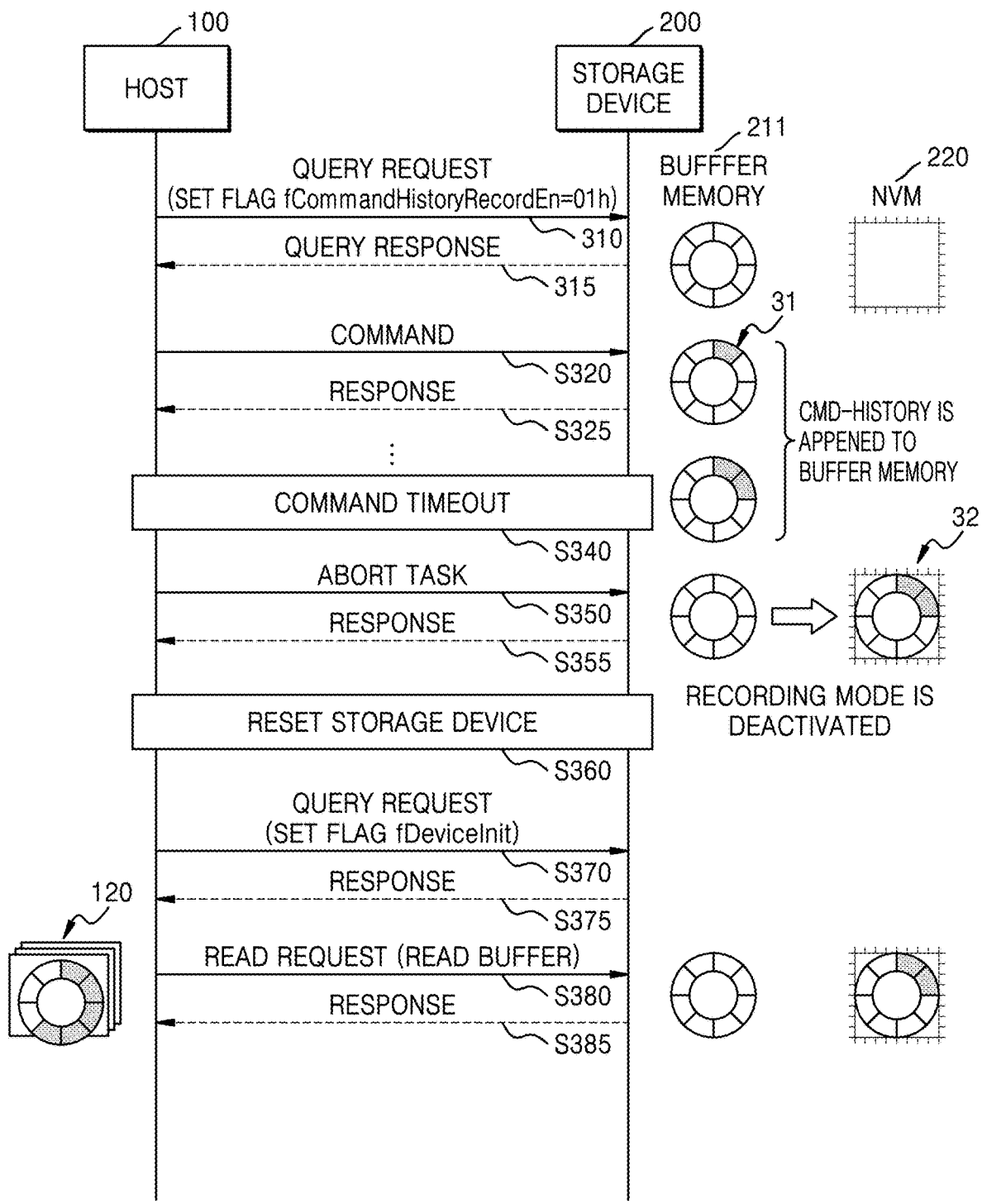
FIG. 8 is a flowchart of operations between a host and a storage device, according to an example embodiment.

FIG. 8 is a flowchart of operations between the host 100 and the storage device 200, according to an example embodiment.

Referring to FIG. 8, the host 100 may set or select a command history record as debugging information, request the storage device 200 to log the command history record as the debugging information when the storage device 200 receives a command, and query for the command history record from the storage device 200 when the debugging information is necessary. Specific operations between the host 100 and the storage device 200 are described below.

The host 100 may transmit a first query request, which requests for a command history record as debugging information, to the storage device 200 in operation S310. For example, the first query request may set or indicate to set a command history record enable flag (fCommandHistoryRecordEn) to 01h. For example, the host 100 may transmit a first query request UPIU to the storage device 200. The storage device 200 may set the fCommandHistoryRecordEn in response to the first query request and transmit a first query response including the setting result to the host 100 in operation S315.

The host 100 may transmit a command to the storage device 200 in operation S320. The storage device 200 may transmit a response to the host 100 in operation S325. Operations S320 and S325 may be repeatedly performed several times, and the storage device 200 may log a command reception history in a command history record 31 each time when a command is received from the host 100. The command history record 31 may be stored in the buffer memory 211 of the storage device 200. In other words, a command history may be appended to the buffer memory 211.

A command timeout may occur in operation S340. For example, when a response is not transmitted from the storage device 200 in a certain time period, a command timeout may occur. The host 100 may transmit a task abort request to the storage device 200 in operation S350. Here, a task is a command or a sequence of actions, which perform a requested service. A logical unit of the storage device 200 includes a task queue that supports execution of at least one task. For example, the host 100 may transmit a task abort request UPIU, which aborts a certain task in the task queue of a certain logical unit of the storage device 200, to the storage device 200. The storage device 200 may transmit a response to the task abort request to the host 100 in operation S355.

In an example embodiment, the storage device 200 may back up the command history record 31, which has been logged in the buffer memory 211, to the NVM 220 between operations S350 and S355, and the NVM 220 may store a command history record 32 as a backup. At this time, the storage device 200 may deactivate a recording mode with respect to the command history record 31. In an example embodiment, the storage device 200 may back up the command history record 31, which has been logged in the buffer memory 211, to the NVM 220 after operation S355. In an example embodiment, the storage device 200 may back up the command history record 31, which has been logged in the buffer memory 211, to the NVM 220 after operation S340.

The storage device 200 may be reset in operation S360. The host 100 may transmit a second query request, which sets or indicates to set a device initialization flag fDeviceInit, to the storage device 200 in operation S370. The storage device 200 may set the device initialization flag fDeviceInit in response to the second query request and transmit a second query response including the setting result to the host 100 in operation S375.

The host 100 may transmit a read request to the storage device 200 in operation S380. For example, the host 100 may transmit the read request, which instructs the NVM 220 of the storage device 200, to the storage device 200. For example, the host 100 may transmit the read request, which sets a buffer ID to 01h and a mode to 1Dh, to the storage device 200. The storage device 200 may transmit a response, which includes the command history record 32 backed up in the NVM 220, to the host 100 in operation S385. The host 100 may load the command history record 32 to the host memory 120 as debugging information.

Figure 9:
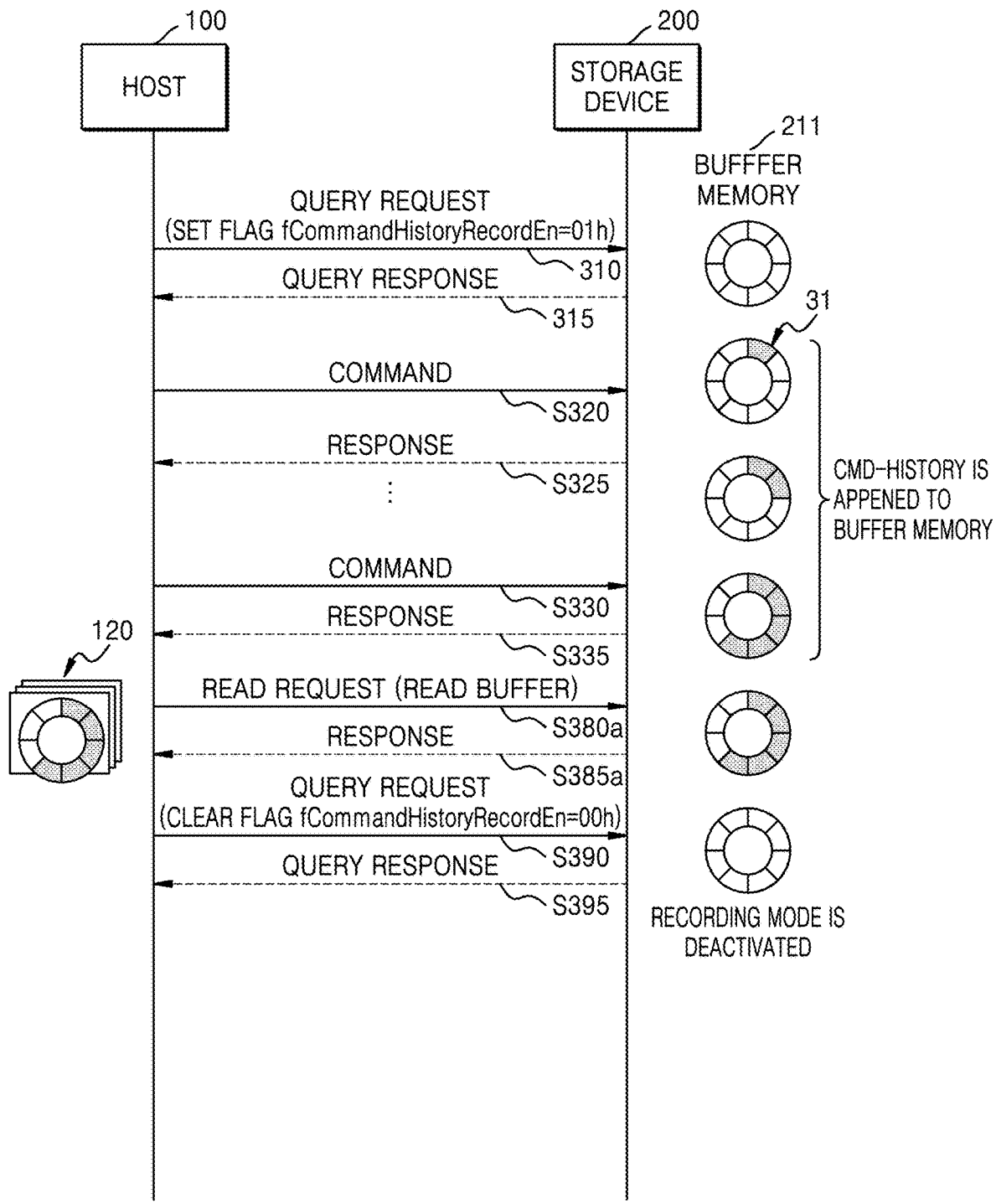
FIG. 9 is a flowchart of operations between a host and a storage device, according to an example embodiment.

FIG. 9 is a flowchart of operations between the host 100 and the storage device 200, according to an example embodiment. The operations in FIG. 9 correspond to a modification of the operations in FIG. 8. The descriptions given above with reference to FIG. 8 may also be applied to the present example embodiment.

Referring to FIG. 9, the host 100 may transmit a first query request, which requests for a command history record as debugging information, to the storage device 200 in operation S310. The storage device 200 may set the fCommandHistoryRecordEn in response to the first query request and transmit a first query response including the setting result to the host 100 in operation S315.

The host 100 may transmit a command to the storage device 200 in operation S320. The storage device 200 may transmit a response to the host 100 in operation S325. The host 100 may transmit a command to the storage device 200 in operation S330. The storage device 200 may transmit a response to the host 100 in operation S335. Operations S320 to S335 may be repeatedly performed several times, and the storage device 200 may log a command reception history in the command history record 31 each time when a command is received from the host 100. The command history record 31 may be stored in the buffer memory 211 of the storage device 200. In other words, a command history may be continuously appended to the buffer memory 211.

The host 100 may transmit a read request to the storage device 200 in operation S380a. For example, the host 100 may transmit the read request, which instructs the buffer memory 211 of the storage device 200, to the storage device 200. For example, the host 100 may transmit the read request, which sets a buffer ID to 00h and a mode to 1Dh, to the storage device 200. The storage device 200 may transmit a response, which includes the command history record 31 logged in the buffer memory 211, to the host 100 in operation S385a. The host 100 may load the command history record 31 to the host memory 120 as debugging information. According to the present example embodiment, because a device reset does not occur unlike FIG. 8, the storage device 200 may not need to back up the command history record 31, which has been logged in the buffer memory 211, to the NVM 220, and the host 100 may query for the command history record 31 logged in the buffer memory 211.

The host 100 may transmit a third query request, which stops recording the command history, to the storage device 200 in operation S390. For example, the third query request may clear the fCommandHistoryRecordEn to 00h. For example, the host 100 may transmit a third query request UPIU to the storage device 200. The storage device 200 may clear the fCommandHistoryRecordEn to 00h in response to the third query request and transmit a third query response including the clear result to the host 100 in operation S395. As the fCommandHistoryRecordEn is cleared to 00h, the storage device 200 may deactivate the recording mode with respect to the command history record 31.

Figure 10:
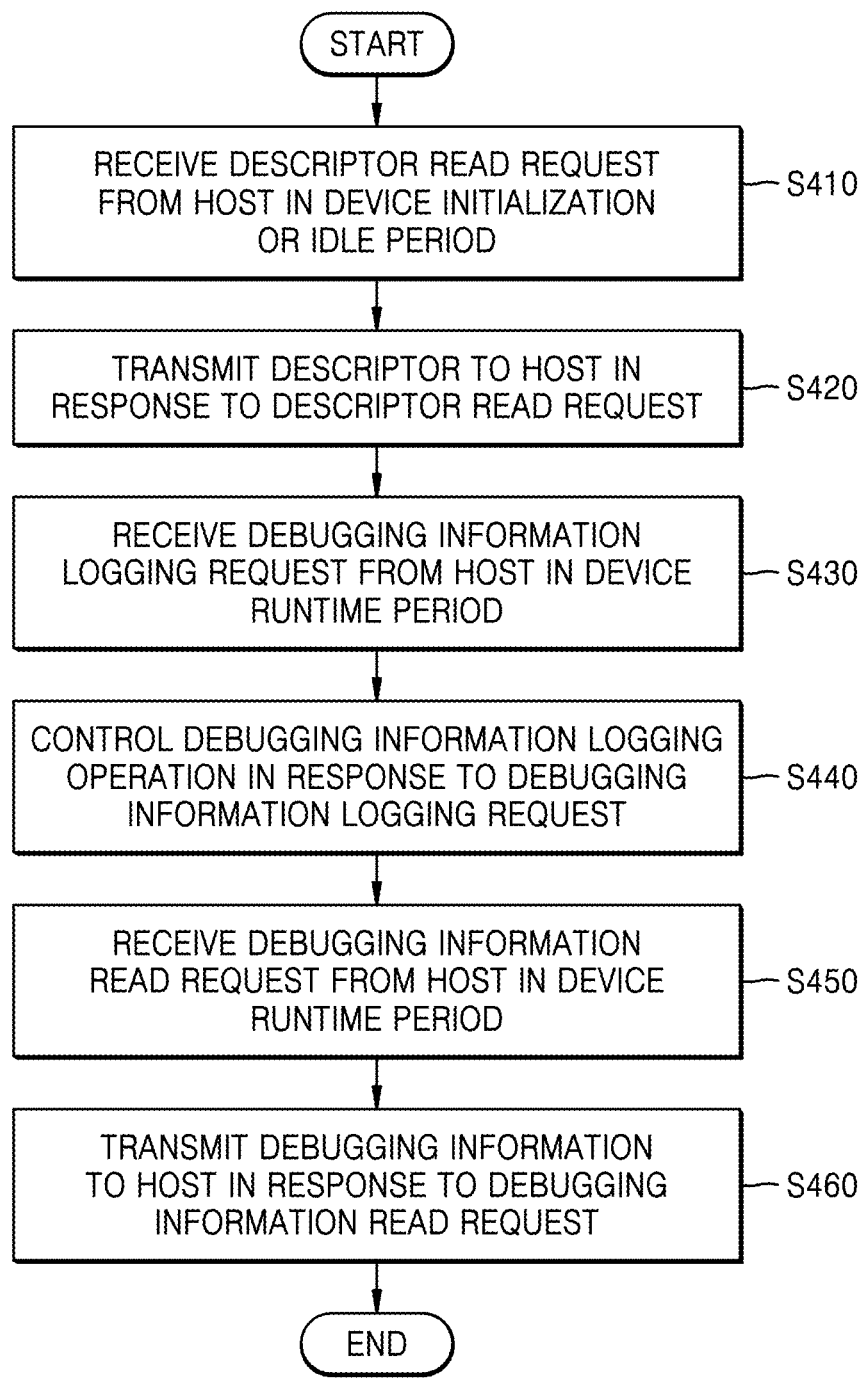
FIG. 10 is a flowchart of an operating method of a storage device, according to an example embodiment.

FIG. 10 is a flowchart of an operating method of a storage device, according to an example embodiment. Referring to FIG. 10, the operating method of a storage device, according to the present example embodiment, corresponds to a debugging information logging method of a storage device and may include, for example, operations time-sequentially performed by the storage device 200 in FIG. 1 or the storage device 200a in FIG. 2. The descriptions given above with reference to FIGS. 1 to 3 may also be applied to the present example embodiment, and redundant descriptions thereof are omitted.

The storage device 200 may receive a descriptor read request from the host 100 in a device initialization or idle period in operation S410. The storage device 200 may transmit a descriptor to the host 100 in response to the descriptor read request in operation S420. The storage device 200 may receive a debugging information logging request from the host 100 in a device runtime period in operation S430. The storage device 200 may control a debugging information logging operation in response to the debugging information logging request in operation S440. The storage device 200 may receive a debugging information read request from the host 100 in the device runtime period in operation S450. The storage device 200 may transmit debugging information to the host 100 in response to the debugging information read request in operation S460.

Figure 11:
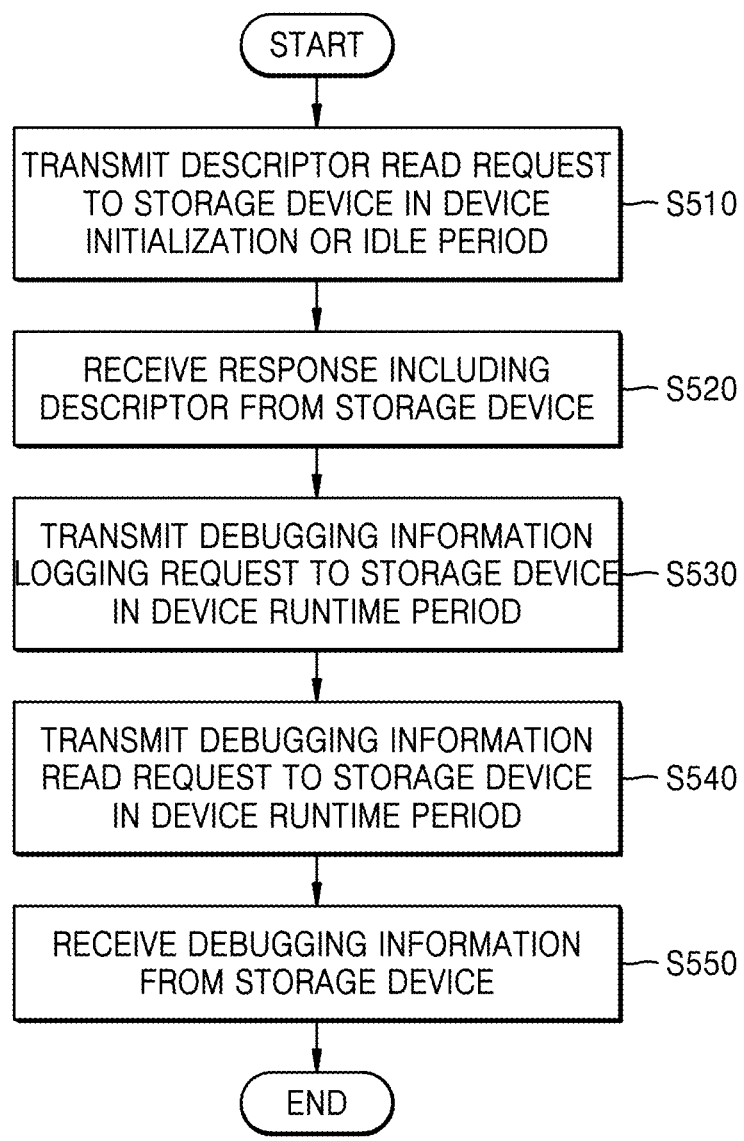
FIG. 11 is a flowchart of an operating method of a host, according to an example embodiment.

FIG. 11 is a flowchart of an operating method of a host, according to an example embodiment. Referring to FIG. 11, the operating method of a host, according to the present example embodiment, corresponds to a debugging information logging method using a storage device and may include, for example, operations time-sequentially performed by the host 100 in FIG. 1 or the host 100a in FIG. 2. The descriptions given above with reference to FIGS. 1 to 3 may also be applied to the present example embodiment, and redundant descriptions thereof are omitted.

The host 100 may transmit a descriptor read request to the storage device 200 in a device initialization or idle period in operation S510. The host 100 may receive a response including a descriptor from the storage device 200 in operation S520. The host 100 may transmit a debugging information logging request to the storage device 200 in a device runtime period in operation S530. The host 100 may transmit a debugging information read request to the storage device 200 in the device runtime period in operation S540. The host 100 may receive debugging information from the storage device 200 in operation S550.

Figure 12:
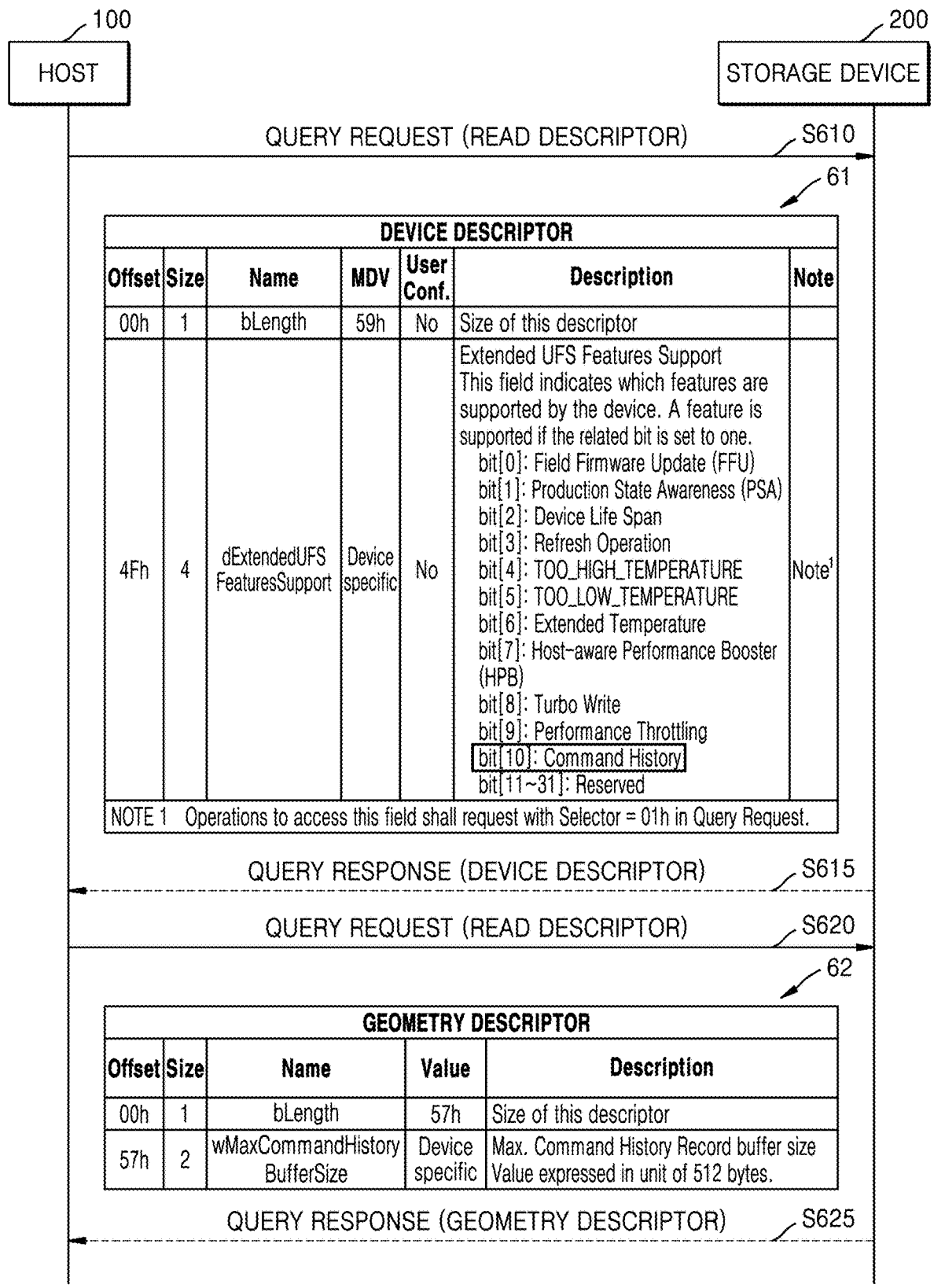
FIG. 12 is a flowchart of operations between a host and a storage device in an initialization or idle period of the storage device, according to an example embodiment.

FIG. 12 is a flowchart of operations between the host 100 and the storage device 200 in an initialization or idle period of the storage device 200, according to an example embodiment. Referring to FIG. 12, the operations according to the present example embodiment may correspond to an example implementation of the operating methods of FIGS. 10 and 11. Descriptions are made with reference to FIGS. 1 and 12 below.

To query whether the storage device 200 supports a command history record feature, the host 100 may transmit a first query request in order to read a first descriptor, to the storage device 200 in operation S610. For example, the host 100 may transmit a first query request UPIU to the storage device 200. For example, the first descriptor may correspond to a device descriptor 61 and may be stored in the storage device 200. For example, the device descriptor 61 may include a command history bit, e.g., bit[10], indicating whether the command history record feature is supported. For example, operation S610 may be performed in the initialization or idle period of the storage device 200 and may correspond to an example of operation S410 in FIG. 10 and operation S510 in FIG. 11.

The storage device 200 may transmit a first query response, which includes at least part of the device descriptor 61 corresponding to the first descriptor, to the host 100 in operation S615. For example, the storage device 200 may transmit a first query response UPIU to the host 100. For example, the storage device 200 may read the device descriptor 61 from the buffer memory 211 or the NVM 220 and transmit the device descriptor 61 to the host 100. The host 100 may determine whether the command history record feature is supported, based on a certain field, e.g., bit[10], of the device descriptor 61. For example, operation S615 may be performed in the initialization or idle period of the storage device 200 and may correspond to an example of operation S420 in FIG. 10 and operation S520 in FIG. 11.

To query for the maximum size of a command history buffer corresponding to a command history record in the storage device 200, the host 100 may transmit a second query request in order to reads a second descriptor, to the storage device 200 in operation S620. For example, the host 100 may transmit a second query request UPIU to the storage device 200. For example, the second descriptor may correspond to a geometry descriptor 62 and may be stored in the storage device 200. For example, the geometry descriptor 62 may include a value indicating the maximum size of the command history buffer, i.e., wMaxCommandHistoryBufferSize. For example, operation S620 may be performed in the initialization or idle period of the storage device 200 and may correspond to an example of operation S410 in FIG. 10 and operation S510 in FIG. 11.

The storage device 200 may transmit a second query response, which includes at least part of the geometry descriptor 62 corresponding to the second descriptor, to the host 100 in operation S625. For example, the storage device 200 may transmit a second query response UPIU to the host 100. For example, the storage device 200 may read the geometry descriptor 62 from the buffer memory 211 or the NVM 220 and transmit the geometry descriptor 62 to the host 100. The host 100 may determine the maximum size of the command history buffer, based on a certain field of the geometry descriptor 62. For example, operation S625 may be performed in the initialization or idle period of the storage device 200 and may correspond to an example of operation S420 in FIG. 10 and operation S520 in FIG. 11.

Figure 13:
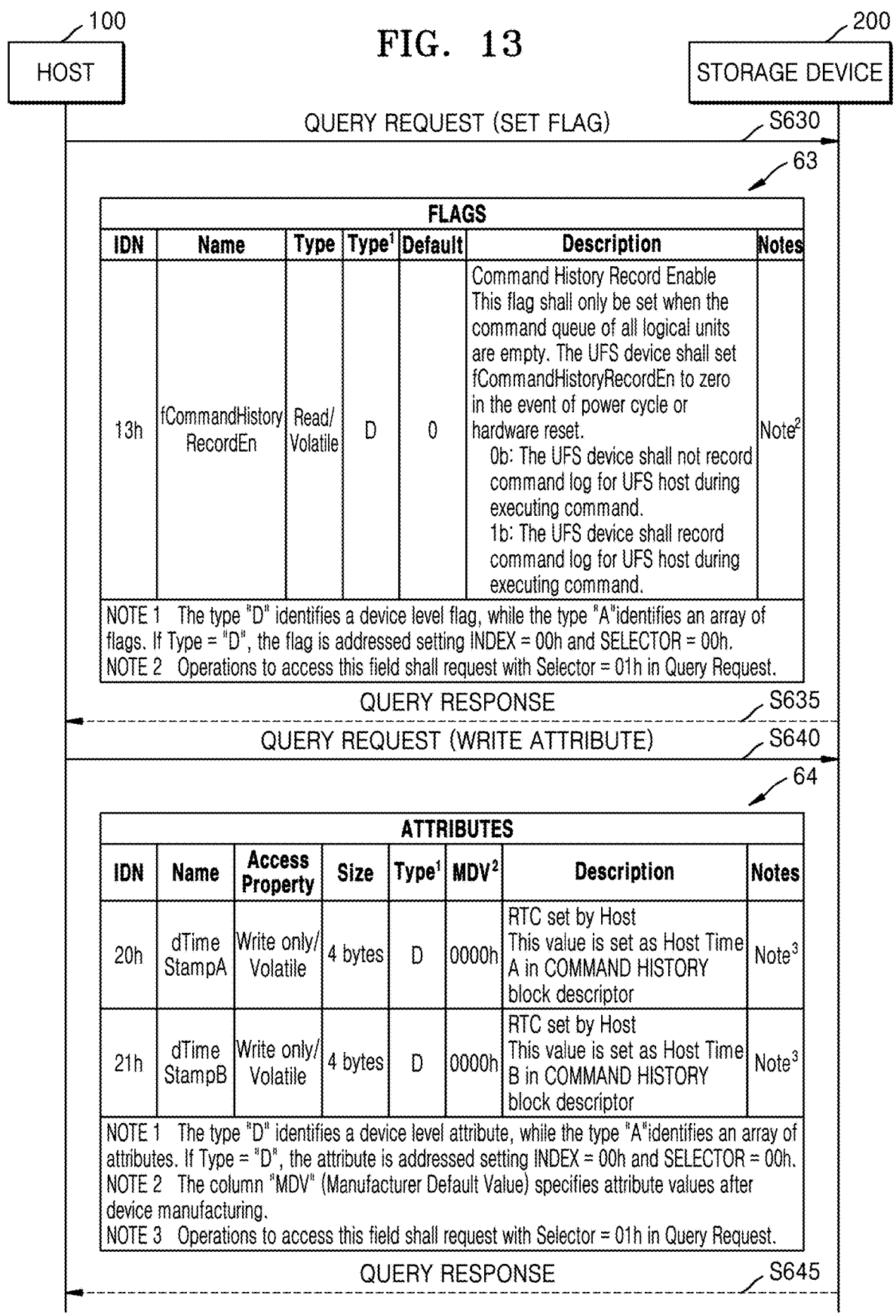
FIG. 13 is a flowchart of operations between a host and a storage device in a runtime period of the storage device, according to an example embodiment.

FIG. 13 is a flowchart of operations between the host 100 and the storage device 200 in a runtime period of the storage device 200, according to an example embodiment. Referring to FIG. 13, the operations according to the present example embodiment may correspond to an example implementation of the operating methods of FIGS. 10 and 11, and the operations of FIG. 13 may be performed after the operations of FIG. 12, but example embodiments are not limited thereto. Descriptions are made with reference to FIGS. 1 and 13 below.

To instruct to start command history recording, the host 100 may transmit a third query request, which sets or indicates to set a first flag for a command history record, to the storage device 200 in operation S630. For example, the host 100 may transmit a third query request UPIU to the storage device 200. For example, the first flag may correspond to an fCommandHistoryRecordEn 63 and may be stored in the storage device 200. For example, the fCommandHistoryRecordEn 63 may be set to a default of 0 during a power cycle or a hardware reset, and the host 100 may set the fCommandHistoryRecordEn 63 to 1 through the third query request. For example, operation S630 may be performed in the runtime period of the storage device 200 and may correspond to an example of operation S430 in FIG. 10 and operation S530 in FIG. 11.

The storage device 200 may transmit a third query response, which includes the result of setting the first flag, to the host 100 in operation S635. For example, the storage device 200 may transmit a third query response UPIU to the host 100. For example, the storage device 200 may set the fCommandHistoryRecordEn 63 corresponding to the first flag in response to the third query request and start a command history record operation. Accordingly, after operation S635, the storage device 200 may log a command reception history in the command history record each time when a command is received from the host 100.

To instruct to perform time setting, the host 100 may transmit a fourth query request, which writes a first attribute for the time setting, to the storage device 200 in operation S640. For example, the host 100 may transmit a fourth query request UPIU to the storage device 200. For example, the first attribute may correspond to a time stamp attribute 64 and may be stored in the storage device 200. For example, the time stamp attribute 64 may include a first time stamp dTimeStampA and a second time stamp dTimeStampB. For example, a value of the first time stamp dTimeStampA may correspond to a first real time clock (RTC) set by the host 100 and may be set as host time A in a command history block descriptor. For example, a value of the second time stamp dTimeStampB may correspond to a second RTC set by the host 100 and may be set as host time B in the command history block descriptor.

The storage device 200 may transmit a fourth query response, which includes the result of writing the first attribute, to the host 100 in operation S645. For example, the storage device 200 may transmit a fourth query response UPIU to the host 100. For example, the storage device 200 may write the first time stamp dTimeStampA and the second time stamp dTimeStampB, which correspond to the first attribute, in response to the fourth query request and include the first time stamp dTimeStampA and the second time stamp dTimeStampB in the command history record.

Figure 14:
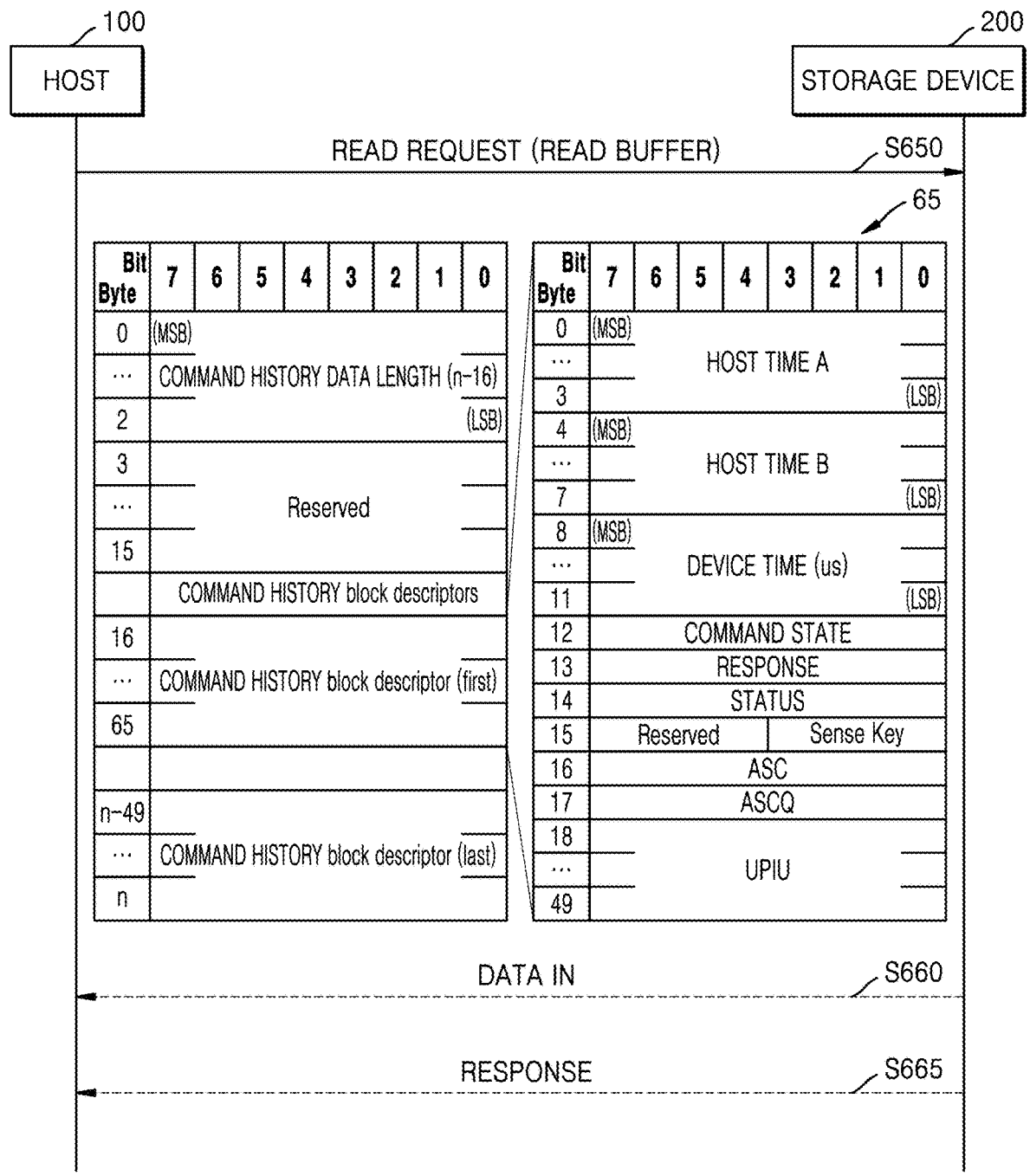
FIG. 14 is a flowchart of operations between a host and a storage device in a runtime period of the storage device, according to an example embodiment.

FIG. 14 is a flowchart of operations between the host 100 and the storage device 200 in a runtime period of the storage device 200, according to an example embodiment. Referring to FIG. 14, the operations according to the present example embodiment may correspond to an example implementation of the operating methods of FIGS. 10 and 11, and the operations of FIG. 14 may be performed after the operations of FIG. 13, but example embodiments are not limited thereto. Descriptions are made with reference to FIGS. 1 and 14 below.

The host 100 may transmit a read request to the storage device 200 to query for a command history record 65 in operation S650. For example, the host 100 may transmit a read buffer UPIU to the storage device 200. For example, the command history record 65 may be stored in the buffer memory 211 or the NVM 220 of the storage device 200. For example, the command history record 65 may include a command history block descriptor. The command history block descriptor may include the host time A according to the first time stamp dTimeStampA, the host time B according to the second time stamp dTimeStampB, and a device time.

The storage device 200 may transmit data corresponding to the command history record 65 to the host 100 in operation S660. For example, the storage device 200 may transmit a data-in UPIU to the host 100. The storage device 200 may transmit a response, which includes the data transmission result, to the host 100 in operation S665. In detail, the storage device 200 may transmit a response including a success to the host 100 when data is completely transmitted normally and may transmit a response including a failure to the host 100 when data is not transmitted normally. For example, the storage device 200 may transmit a response UPIU to the host 100.

Figure 15:
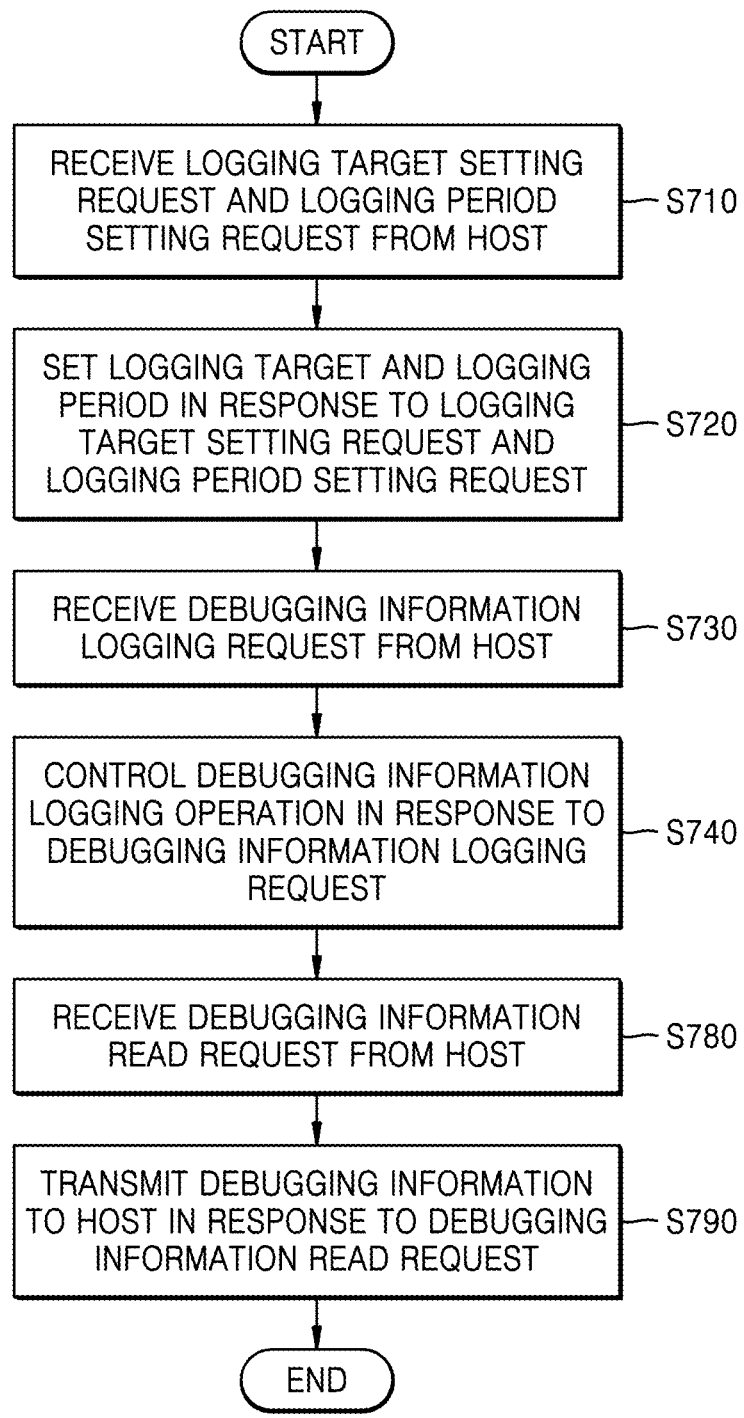
FIG. 15 is a flowchart of an operating method of a storage device, according to an example embodiment.

FIG. 15 is a flowchart of an operating method of a storage device, according to an example embodiment. Referring to FIG. 15, the operating method of a storage device, according to the present example embodiment, corresponds to a debugging information logging method of a storage device and may include, for example, operations time-sequentially performed by the storage device 200 in FIG. 1 or the storage device 200a in FIG. 2. The descriptions given above with reference to FIGS. 1 to 3 may also be applied to the present example embodiment, and redundant descriptions thereof are omitted.

The storage device 200 may receive a logging target setting request and a logging period setting request from the host 100 in operation S710. The storage device 200 may set a logging target and a logging period in response to the logging target setting request and the logging period setting request in operation S720. The storage device 200 may receive a debugging information logging request from the host 100 in operation S730. The storage device 200 may control a debugging information logging operation in response to the debugging information logging request in operation S740. The storage device 200 may receive a debugging information read request from the host 100 in operation S780. The storage device 200 may transmit debugging information to the host 100 in response to the debugging information read request in operation S790.

Figure 16:
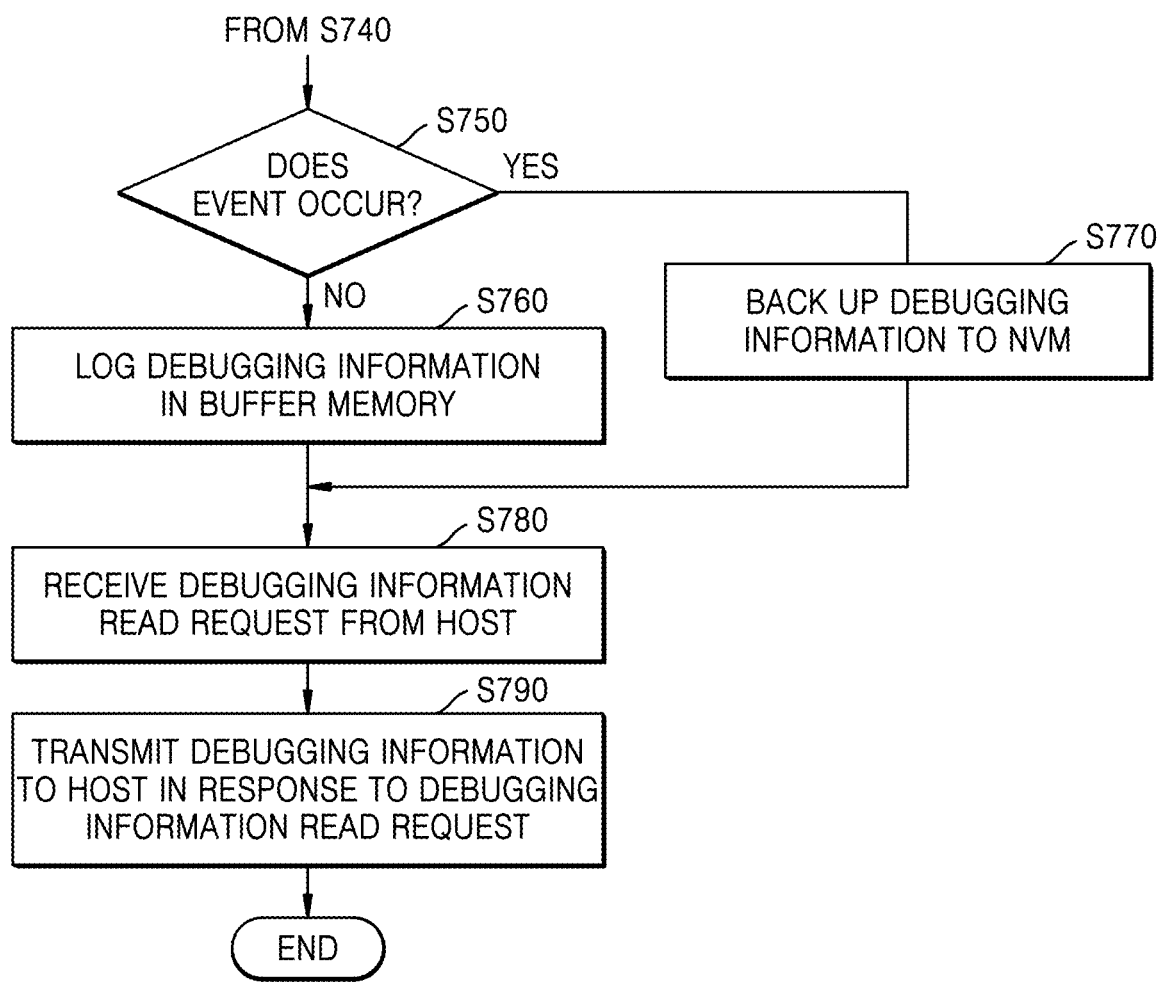
FIG. 16 is a flowchart of an operating method of a storage device, according to an example embodiment.

FIG. 16 is a flowchart of an operating method of a storage device, according to an example embodiment. Referring to FIG. 16, the operating method of a storage device, according to the present example embodiment, corresponds to a modification of the operating method of FIG. 15. The descriptions given above with reference to FIG. 15 may also be applied to the present example embodiment, and redundant descriptions thereof are omitted.

The storage device 200 may determine whether an event occurs in operation S750. For example, an event may include reception of a task abort request from the host 100. For example, an event may include a reset of the storage device 200. When no event occurs, the storage device 200 may log debugging information in the buffer memory 211 in operation S760. Otherwise, when an event occurs, the storage device 200 may back up the debugging information to the NVM 220 in operation S770. The storage device 200 may receive the debugging information read request from the host 100 in operation S780. The storage device 200 may transmit the debugging information to the host 100 in response to the debugging information read request in operation S790.

Figure 17:
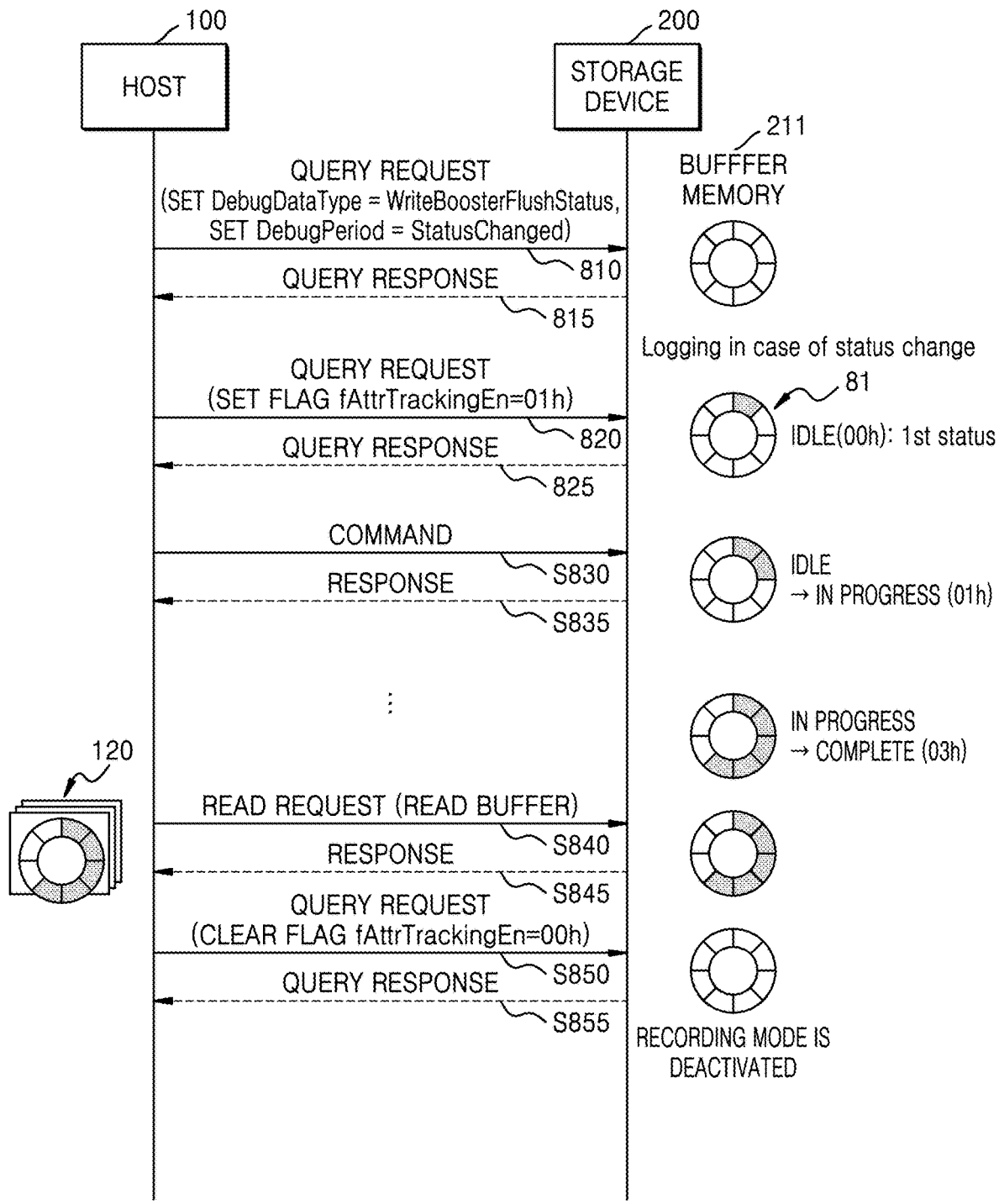
FIG. 17 is a flowchart of operations between a host and a storage device, according to an example embodiment.

FIG. 17 is a flowchart of operations between the host 100 and the storage device 200, according to an example embodiment. Referring to FIG. 17, the operations according to the present example embodiment may correspond to an example implementation of the operating methods of FIGS. 15 and 16. Descriptions are made with reference to FIGS. 1 and 17 below.

According to the present example embodiment, the host 100 may set a device status change record as debugging information and may set, for example, a write booster flush status as a device status change. The host 100 may set a debugging target and a debugging time or period such that the storage device 200 logs the device status change record as the debugging information. The storage device 200 may log the debugging target as the debugging information at the debugging time or period set by the host 100. The operations between the host 100 and the storage device 200 are described in more detail below.

The host 100 may transmit a first query request, which sets a logging target and a logging time with respect to debugging information, to the storage device 200 in operation S810. In other words, the first query request may include a logging target setting request and a logging time or period setting request. The host 100 may set the logging target to a write booster flush status and the logging time to a status change time, i.e., a time when a value of the write booster flush status is changed. The host 100 may set or write WriteBoosterFlushStatus as a first attribute for a debug data type and may set or write StatusChanged as a second attribute for a debug period. For example, the host 100 may transmit a first query request UPIU, which sets the first and second attributes, to the storage device 200. For example, operation S810 may correspond to an example of operation S710 in FIG. 15.

The storage device 200 may set the logging target and the logging period in response to the logging target setting request and the logging period setting request, which are included in the first query request, and transmit a first query response to the host 100 in operation S815. For example, the storage device 200 may transmit a first query response UPIU, which includes the result of writing or setting the first and second attributes, i.e., the result of setting the logging target and the logging period. For example, operation S815 may correspond to an example of operation S720 in FIG. 15.

To instruct to start device status recording, the host 100 may transmit a second query request, which sets or indicates to set a first flag for a device status record, to the storage device 200 in operation S820. For example, the host 100 may transmit a second query request UPIU to the storage device 200. For example, the first flag may correspond to an attribute tracking enable flag fAttrTrackingEn and may be stored in the storage device 200. For example, the host 100 may set the attribute tracking enable flag fAttrTrackingEn to 01$h$ through the second query request. For example, operation S820 may correspond to an example of operation S730 in FIG. 15.

The storage device 200 may transmit a second query response, which includes the result of setting the first flag, to the host 100 in operation S825. For example, the storage device 200 may transmit a second query response UPIU to the host 100. For example, the storage device 200 may set the attribute tracking enable flag fAttrTrackingEn, which corresponds to the first flag, to 01$h$ according to the second query request and start a device status record operation. Accordingly, the storage device 200 may log a device status record 81 in the buffer memory 211 each time when the write booster flush status is changed after operation S825. For example, the storage device 200 may log "IDLE(00$h$)" in the device status record 81 after operation S820.

The host 100 may transmit a command to the storage device 200 in operation S830. The storage device 200 may transmit a response to the command to the host 100 in operation S835. Operations S830 and S835 may be repeatedly performed several times. The storage device 200 may log the write booster flush status in the device status record 81 at every status change. For example, the storage device 200 may log the write booster flush status, which has been changed from "IDLE(00h)" to "IN PROGRESS(01h)", in the device status record 81. Thereafter, for example, the storage device 200 may log the write booster flush status, which has been changed from "IN PROGRESS(01h)" to "COMPLETE(03h)", in the device status record 81.

The host 100 may transmit a read request to the storage device 200 to query for the device status record 81 in operation S840. For example, the host 100 may transmit a read buffer UPIU to the storage device 200. For example, the host 100 may transmit a read request, which instructs the buffer memory 211 of the storage device 200, to the storage device 200. For example, the host 100 may transmit a read request, which sets a buffer ID to 00h and a mode to 1Dh, to the storage device 200. The storage device 200 may transmit a response, which includes the device status record 81 logged in the buffer memory 211, to the host 100 in operation S845. The host 100 may load the device status record 81 to the host memory 120 as the debugging information.

In some example embodiments, when a certain event, such as a device reset, occurs before operation S840, the host 100 may transmit a read request, which instructs the NVM 220 of the storage device 200, to the storage device 200. For example, the host 100 may transmit a read request, which sets the buffer ID to 01h and the mode to 1Dh, to the storage device 200. At this time, the storage device 200 may transmit a response, which includes the device status record 81 backed up to the NVM 220, to the host 100. The host 100 may load the device status record 81 to the host memory 120 as the debugging information.

To instruct to terminate the device status recording, the host 100 may transmit a third query request, which clears the first flag for the device status record, to the storage device 200 in operation S850. For example, the host 100 may transmit a third query request UPIU to the storage device 200. For example, the first flag may correspond to the attribute tracking enable flag fAttrTrackingEn and may be stored in the storage device 200. For example, the host 100 may clear the attribute tracking enable flag fAttrTrackingEn to 00h through the third query request.

The storage device 200 may transmit a third query response, which includes the result of clearing the first flag, to the host 100 in operation S855. For example, the storage device 200 may transmit a third query response UPIU to the host 100. For example, the storage device 200 may clear the attribute tracking enable flag fAttrTrackingEn corresponding to the first flag to 00h according to the third query request and terminate the device status record operation. Accordingly, even when the write booster flush status is changed after operation S855, the storage device 200 may not log the write booster flush status in the device status record 81 thereafter.

In some example embodiments, before operation S810, the host 100 may transmit a query request, e.g., a query request UPIU, which reads a first descriptor, to the storage device 200 to query whether the storage device 200 supports a device status record feature. For example, the first descriptor may correspond to the device descriptor 61 in FIG. 12 and may be stored in the storage device 200. For example, the device descriptor 61 may include a bit indicating whether the device status record feature is supported.

In some example embodiments, before operation S810, the host 100 may transmit a query request, e.g., a query request UPIU, which reads a second descriptor, to the storage device 200 to query for the maximum size of a device status buffer corresponding to a device status record in the storage device 200. For example, the second descriptor may correspond to the geometry descriptor 62 in FIG. 12 and may be stored in the storage device 200. For example, the geometry descriptor 62 may include a value indicating the maximum size of the device status buffer.

Figure 18:
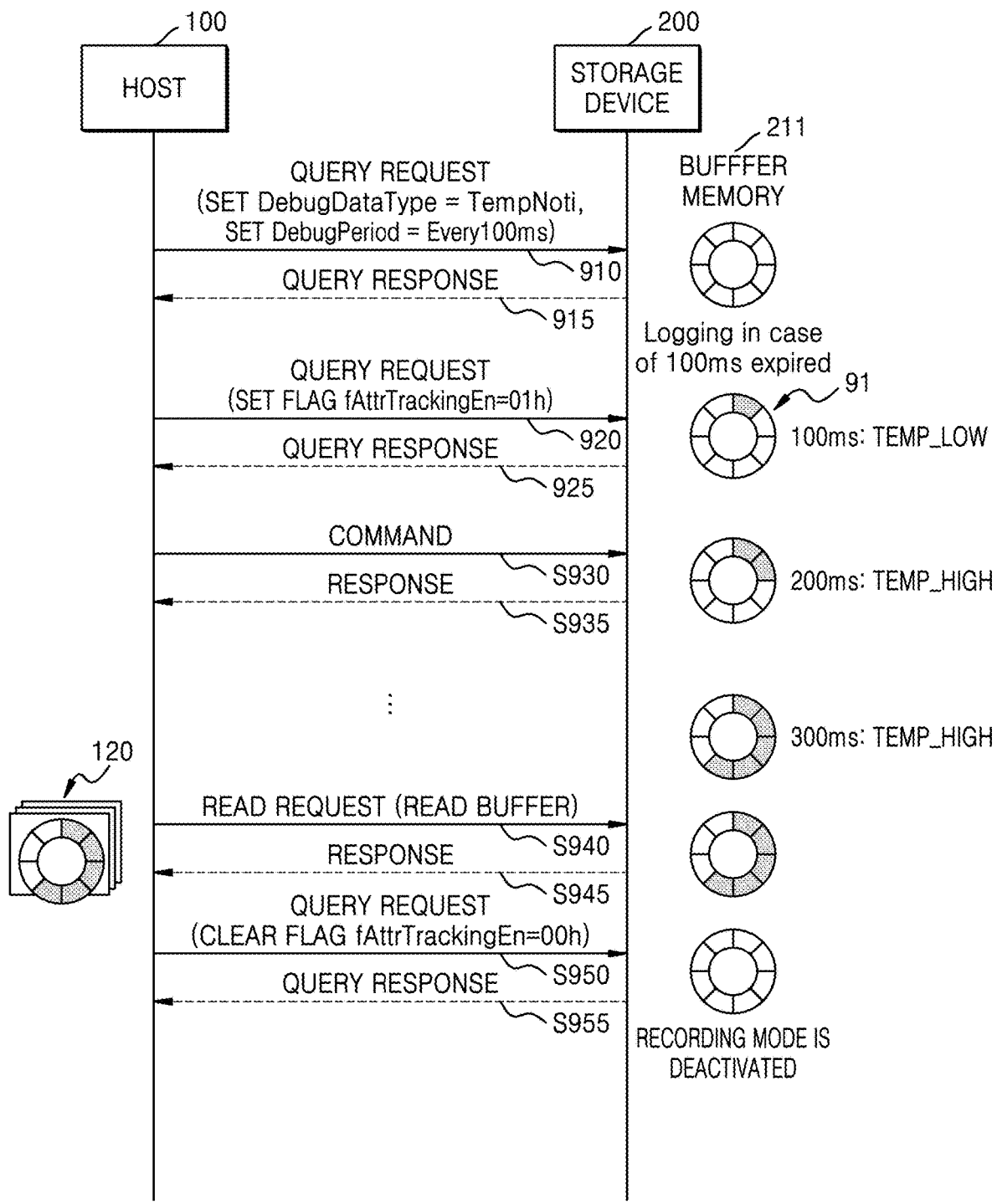
FIG. 18 is a flowchart of operations between a host and a storage device, according to an example embodiment.

FIG. 18 is a flowchart of operations between the host 100 and the storage device 200, according to an example embodiment. The operations of FIG. 18 may correspond to an example implementation of the operating methods of FIGS. 15 and 16. Descriptions are made with reference to FIGS. 1 and 18 below.

The host 100 may set a device status change record as debugging information and may set, for example, a temperature notification as a device status change. The host 100 may set a debugging target and a debugging time or period such that the storage device 200 logs the device status change record as the debugging information. The storage device 200 may log the debugging target as the debugging information at the debugging time or period set by the host 100. The operations between the host 100 and the storage device 200 are described in more detail below.

The host 100 may transmit a first query request, which sets a logging target and a logging time with respect to debugging information, to the storage device 200 in operation S910. In other words, the first query request may include a logging target setting request and a logging time or period setting request. The host 100 may set the logging target to a temperature event notification and the logging period to a first time period. The host 100 may set or write TempNoti corresponding to the temperature notification as a first attribute for a debug data type and may set or write the first time period as a second attribute for a debug period. For example, the host 100 may transmit a first query request UPIU, which sets the first and second attributes, to the storage device 200. For example, the host 100 may set the first time period to 100 ms and transmit the first query request to the storage device 200 such that the storage device 200 logs a temperature notification as debugging information every 100 ms. For example, operation S910 may correspond to an example of operation S710 in FIG. 15.

The storage device 200 may set the logging target and the logging period in response to the logging target setting request and the logging period setting request, which are included in the first query request, and transmit a first query response to the host 100 in operation S915. For example, the storage device 200 may transmit a first query response UPIU, which includes the result of writing or setting the first and second attributes, i.e., the result of setting the logging target and the logging period. For example, operation S915 may correspond to an example of operation S720 in FIG. 15.

To instruct to start device status recording, the host 100 may transmit a second query request, which sets or indicates to set a first flag for a device status record, to the storage device 200 in operation S920. For example, the host 100 may transmit a second query request UPIU to the storage device 200. For example, the first flag may correspond to the attribute tracking enable flag fAttrTrackingEn and may be stored in the storage device 200. For example, the host 100 may set the attribute tracking enable flag fAttrTrackingEn to 01h through the second query request. For example, operation S920 may correspond to an example of operation S730 in FIG. 15.

The storage device 200 may transmit a second query response, which includes the result of setting the first flag, to the host 100 in operation S925. For example, the storage device 200 may transmit a second query response UPIU to the host 100. For example, the storage device 200 may set the attribute tracking enable flag fAttrTrackingEn, which corresponds to the first flag, to 01h according to the second query request and start a device status record operation. The host 100 may transmit a command to the storage device 200 in operation S930. The storage device 200 may transmit a response to the command to the host 100 in operation S935. Operations S930 and S935 may be repeatedly performed several times.

For example, the storage device 200 may log a temperature notification, as a device status record 91, in the buffer memory 211 every 100 ms. For example, the storage device 200 may log a first temperature notification corresponding to a low temperature notification TEMP_LOW in the buffer memory 211 as the device status record 91 when 100 ms elapses. The storage device 200 may log a second temperature notification corresponding to a high temperature notification TEMP_HIGH in the buffer memory 211 as the device status record 91 when 200 ms elapses. The storage device 200 may log a third temperature notification corresponding to the high temperature notification TEMP_HIGH in the buffer memory 211 as the device status record 91 when 300 ms elapses.

The host 100 may transmit a read request to the storage device 200 to query for the device status record 91 in operation S940. For example, the host 100 may transmit a read buffer UPIU to the storage device 200. For example, the host 100 may transmit a read request, which instructs the buffer memory 211 of the storage device 200, to the storage device 200. For example, the host 100 may transmit a read request, which sets a buffer ID to 00h and a mode to 1Dh, to the storage device 200. The storage device 200 may transmit a response, which includes the device status record 91 logged in the buffer memory 211, to the host 100 in operation S945. The host 100 may load the device status record 91 to the host memory 120 as the debugging information.

In some example embodiments, when a certain event, such as a device reset, occurs before operation S940, the host 100 may transmit a read request, which instructs the NVM 220 of the storage device 200, to the storage device 200. For example, the host 100 may transmit a read request, which sets the buffer ID to 01h and the mode to 1Dh, to the storage device 200. At this time, the storage device 200 may transmit a response, which includes the device status record 91 backed up to the NVM 220, to the host 100. The host 100 may load the device status record 91 to the host memory 120 as the debugging information.

To instruct to terminate the device status recording, the host 100 may transmit a third query request, which clears the first flag for the device status record, to the storage device 200 in operation S950. For example, the host 100 may transmit a third query request UPIU to the storage device 200. For example, the first flag may correspond to the attribute tracking enable flag fAttrTrackingEn and may be stored in the storage device 200. For example, the host 100 may clear the attribute tracking enable flag fAttrTrackingEn to 00h through the third query request.

The storage device 200 may transmit a third query response, which includes the result of clearing the first flag, to the host 100 in operation S955. For example, the storage device 200 may transmit a third query response UPIU to the host 100. For example, the storage device 200 may clear the attribute tracking enable flag fAttrTrackingEn corresponding to the first flag to 00h according to the third query request and terminate the device status record operation. Accordingly, even when a temperature notification is received after operation S955, the storage device 200 may not log the device status record 91 in the buffer memory 211.

In some example embodiments, before operation S910, the host 100 may transmit a query request, e.g., a query request UPIU, which reads a first descriptor, to the storage device 200 to query whether the storage device 200 supports a device status record feature. For example, the first descriptor may correspond to the device descriptor 61 in FIG. 12 and may be stored in the storage device 200. For example, the device descriptor 61 may include a bit indicating whether the device status record feature is supported.

In some example embodiments, before operation S910, the host 100 may transmit a query request, e.g., a query request UPIU, which reads a second descriptor, to the storage device 200 to query for the maximum size of a device status buffer corresponding to a device status record in the storage device 200. For example, the second descriptor may correspond to the geometry descriptor 62 in FIG. 12 and may be stored in the storage device 200. For example, the geometry descriptor 62 may include a value indicating the maximum size of the device status buffer.

Figure 19:
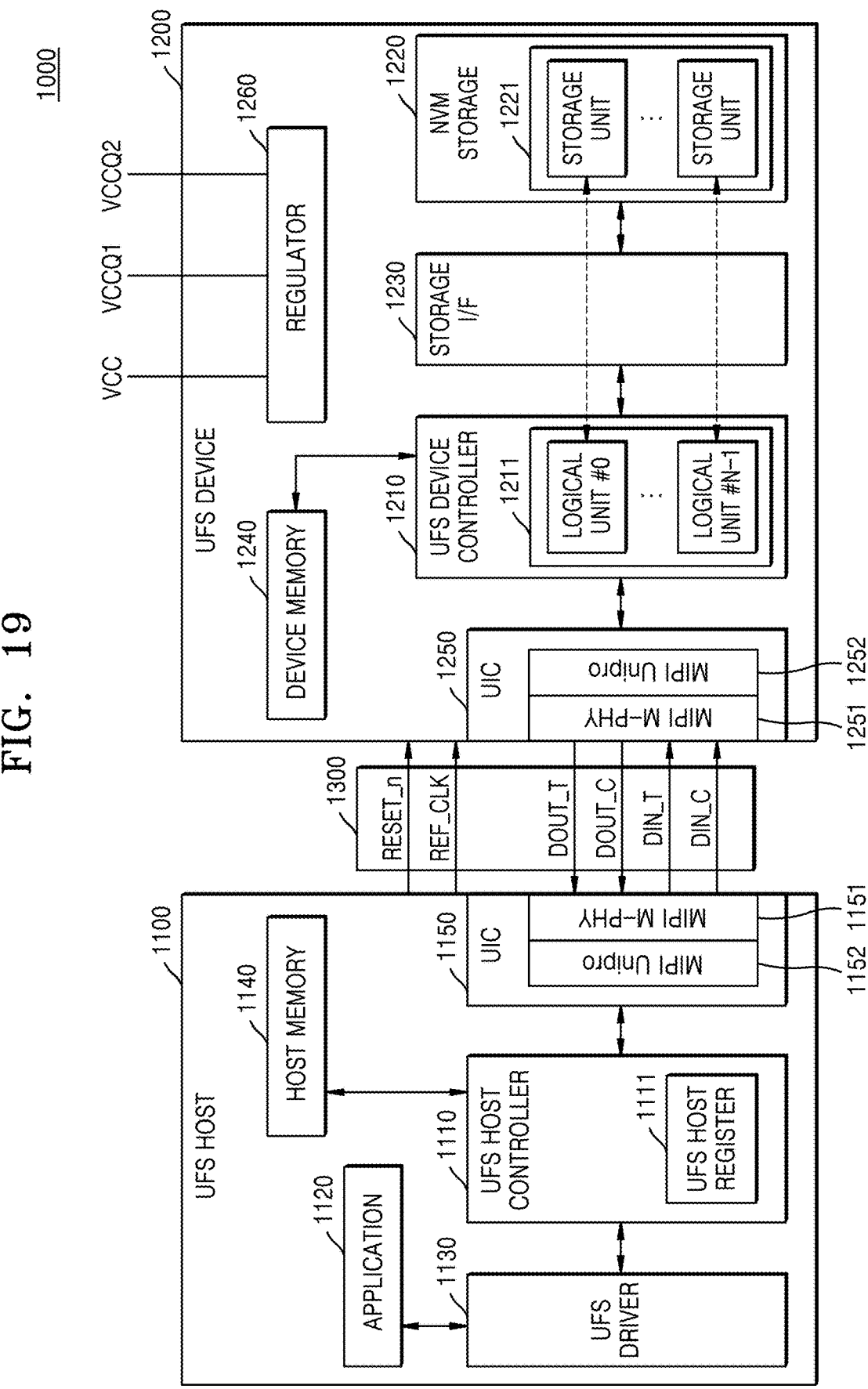
FIG. 19 is a diagram illustrating a universal flash storage (UFS) system according to an example embodiment.

FIG. 19 is a diagram illustrating a UFS system 1000 according to an example embodiment. The UFS system 1000 complies with UFS standards published by the Joint Electron Device Engineering Council (JEDEC) and may include a UFS host 1100, a UFS device 1200, and a UFS interface 1300. The descriptions given above about the storage systems 10 and 10a of FIGS. 1 and 2, the descriptions given above about the device controller 210 of FIG. 3, and the descriptions given above about the operations of the host 100 and the storage device 200 with reference to FIGS. 4 to 18 may also be applied to the UFS system 1000 of FIG. 19 unless the descriptions contradict descriptions given below with reference to FIG. 19.

The UFS host 1100 may include the UFS host controller 1110, an application 1120, a UFS driver 1130, a host memory 1140, and a UFS interconnect (UIC) layer 1150. The UFS device 1200 may include a UFS device controller 1210, an NVM storage 1220, a storage interface 1230, a device memory 1240, a UIC layer 1250, and a regulator 1260. The NVM storage 1220 may include a plurality of storage units 1221. The storage units 1221 may include vertical NAND (VNAND) flash memory in a two-dimensional (2D) or three-dimensional (3D) structure or other kinds of NVM such as PRAM and/or RRAM. The UFS device controller 1210 and the NVM storage 1220 may be connected to each other through the storage interface 1230. The storage interface 1230 may be implemented to comply with a standard protocol such as Toggle or ONFI.

The application 1120 may refer to a program for communicating with the UFS device 1200 to use a function of the UFS device 1200. The application 1120 may transmit an input-output request (IOR) for input/output of the UFS device 1200 to the UFS driver 1130. The IOR may include a data read request, a data write request, and/or a data discard request but is not limited thereto.

The UFS driver 1130 may manage the UFS host controller 1110 through a UFS-host controller interface (HCI). The UFS driver 1130 may convert an IOR, which is generated by the application 1120, into a UFS command defined by a UFS standard and may transmit the UFS command to the UFS host controller 1110. A single IOR may be converted into a plurality of UFS commands A UFS command may be a command that is defined by the small computer small interface (SCSI) standard or an exclusive command for the UFS standard.

The UFS host controller 1110 may transmit the UFS command from the UFS driver 1130 to the UIC layer 1250 of the UFS device 1200 through the UIC layer 1150 and the UFS interface 1300. In this process, a UFS host register of the UFS host controller 1110 may function as a command queue.

The UIC layer 1150 of the UFS host 1100 may include a MIPI M-PHY 1151 and a MIPI UniPro 1152, and the UIC layer 1250 of the UFS device 1200 may also include a MIPI M-PHY 1251 and a MIPI UniPro 1252.

The UFS interface 1300 may include a line transmitting the reference clock signal REF_CLK, a line transmitting a hardware reset signal RESET_n for the UFS device 1200, a pair of lines transmitting a pair of differential input signals DIN_T and DIN_C, and a pair of lines transmitting a pair of differential output signals DOUT_T and DOUT_C.

The frequency value of the reference clock signal REF_CLK provided from the UFS host 1100 to the UFS device 1200 may be one of 19.2 MHz, 26 MHz, 38.4 MHz, and 52 MHz but is not limited thereto. The UFS host 1100 may change the frequency value of the reference clock signal REF_CLK even while operating or exchanging data with the UFS device 1200. The UFS device 1200 may generate clock signals having different frequencies from the reference clock signal REF_CLK, which is received from the UFS host 1100, using a phase-locked loop (PLL) or the like. The UFS host 1100 may set a value of a data rate between the UFS host 1100 and the UFS device 1200 using the frequency value of the reference clock signal REF_CLK. In other words, the value of the data rate may be determined depending on the frequency value of the reference clock signal REF_CLK.

The UFS interface 1300 may support multiple lanes, and each of the lanes may be implemented as a differential pair. For example, the UFS interface 1300 may include at least one receive lane and at least one transmit lane. In FIG. 19, a pair of lines transmitting the pair of differential input signals DIN_T and DIN_C may form a receive lane, and a pair of lines transmitting the pair of differential output signals DOUT_T and DOUT_C may form a transmit lane. Although one transmit lane and one receive lane are illustrated in FIG. 19, the numbers of transmit lanes and receive lanes may be changed.

A receive lane and a transmit lane may transmit data in a serial communication mode. Because the receive lane is separated from the transmit lane, the UFS host 1100 may communicate with the UFS device 1200 in a full-duplex mode. In other words, the UFS device 1200 may transmit data to the UFS host 1100 through the transmit lane even while receiving data from the UFS host 1100 through the receive lane. Control data such as a command from the UFS host 1100 to the UFS device 1200 may be transmitted through the same lane as user data, which the UFS host 1100 writes to or reads from the NVM storage 1220 of the UFS device 1200. Accordingly, other lanes for data transmission than a pair of a receive lane and a transmit lane are not necessary between the UFS host 1100 and the UFS device 1200.

The UFS device controller 1210 of the UFS device 1200 may generally control operations of the UFS device 1200. The UFS device controller 1210 may manage the NVM storage 1220 using a logical unit 1211 corresponding to a logical data storage unit. The number of logical units 1211 may be eight but is not limited thereto. The UFS device controller 1210 may include a flash translation layer (FTL) and may translate a logical address, e.g., a logical block address (LBA), received from the UFS host 1100 into a physical data address, e.g., a physical block address (PBA), using address mapping information of the FTL. A logical block for storing user data in the UFS system 1000 may have a size in a certain range. For example, a minimum size of a logical block may be set to 4 Kbytes.

When a command from the UFS host 1100 is input to the UFS device 1200 through the UIC layer 1250, the UFS device controller 1210 may perform an operation corresponding to the command and transmit a completion response to the UFS host 1100 after the operation is completed.

For example, when the UFS host 1100 writes user data in the UFS device 1200, the UFS host 1100 may transmit a data write command to the UFS device 1200. When the UFS host 1100 receives a response corresponding to ready-to-transfer from the UFS device 1200, the UFS host 1100 may transmit the user data to the UFS device 1200. The UFS device controller 1210 may temporarily store the user data in the device memory 1240 and write the user data temporarily stored in the device memory 1240 to a selected position of the NVM storage 1220.

In another example, when the UFS host 1100 reads user data from the UFS device 1200, the UFS host 1100 may transmit a data read command to the UFS device 1200. The UFS device controller 1210 may receive the data read command, read the user data from the NVM storage 1220 based on the data read command, and temporarily store the user data, which has been read, in the device memory 1240. In this read operation, the UFS device controller 1210 may detect and correct an error in the user data, which has been read, using an embedded error correction code (ECC) engine (not shown). In detail, the ECC engine may generate parity bits with respect to data to be written to the NVM storage 1220, and the parity bits may be stored in the NVM storage 1220 together with the data. When data is read from the NVM storage 1220, the ECC engine may correct an error in the data using parity bits, which are read from the NVM storage 1220 together with the data and may output error-corrected read data.

The UFS device controller 1210 may transmit the user data, which has been temporarily stored in the device memory 1240, to the UFS host 1100. The UFS device controller 1210 may further include an advanced encryption standard (AES) engine (not shown). The AES engine may perform at least one selected from encryption and decryption of data input to the UFS device controller 1210 using a symmetric-key algorithm.

The UFS host 1100 may store commands to be transmitted to the UFS device 1200 in the UFS host register 1111, which may function as a command queue, in order and transmit the commands to the UFS device 1200 in the order. At this time, even while a command transmitted to the UFS device 1200 is being processed by the UFS device 1200, i.e., even before the UFS host 1100 is notified that a command transmitted to the UFS device 1200 has been completely processed by the UFS device 1200, the UFS host 1100 may transmit a subsequent command in the command queue to the UFS device 1200, and the UFS device 1200 may receive the subsequent command from the UFS host 1100 even while processing the command received before. Queue depth, i.e., the maximum number of commands that may be stored in the command queue, may be 32. The command queue may be a circular queue, in which a head pointer and a tail pointer respectively indicate the beginning and end of a command sequence stored therein.

Each of the storage units 1221 may include a memory cell array (not shown) and a control circuit (not shown), which controls the operation of the memory cell array. The memory cell array may include a 2D memory cell array or a 3D memory cell array. The memory cell array includes a plurality of memory cells. Each of the memory cells may be a single-level cell (SLC) storing one bit of information or a cell, such as a multi-level cell (MLC), a triple-level cell (TLC), or a quadruple-level cell (QLC), which stores at least two bits of information. A 3D memory cell array may include a vertically-oriented NAND string, in which at least one memory cell is arranged above another memory cell.

Supply voltages VCC, VCCQ, and VCCQ2 may be input to the UFS device 1200. The supply voltage VCC may be a main supply voltage for the UFS device 1200 and may have a value of about 2.4 V to about 3.6 V. The supply voltage VCCQ may be used for supply of a voltage in a low range and mainly used for the UFS device controller 1210. The supply voltage VCCQ may have a value of about 1.14 V to about 1.26 V. The supply voltage VCCQ2 may be used to supply a voltage that is lower than the supply voltage VCC and higher than the supply voltage VCCQ and mainly used for an input/output interface such as the MIPI M-PHY 1251. The supply voltage VCCQ2 may have a value of about 1.7 V to about 1.95 V. Each of the supply voltages VCC, VCCQ, and VCCQ2 may be supplied to a corresponding element of the UFS device 1200 through the regulator 1260. The regulator 1260 may be implemented as a group of regulator units respectively connected to the supply voltages VCC, VCCQ, and VCCQ2.

Figure 20A:
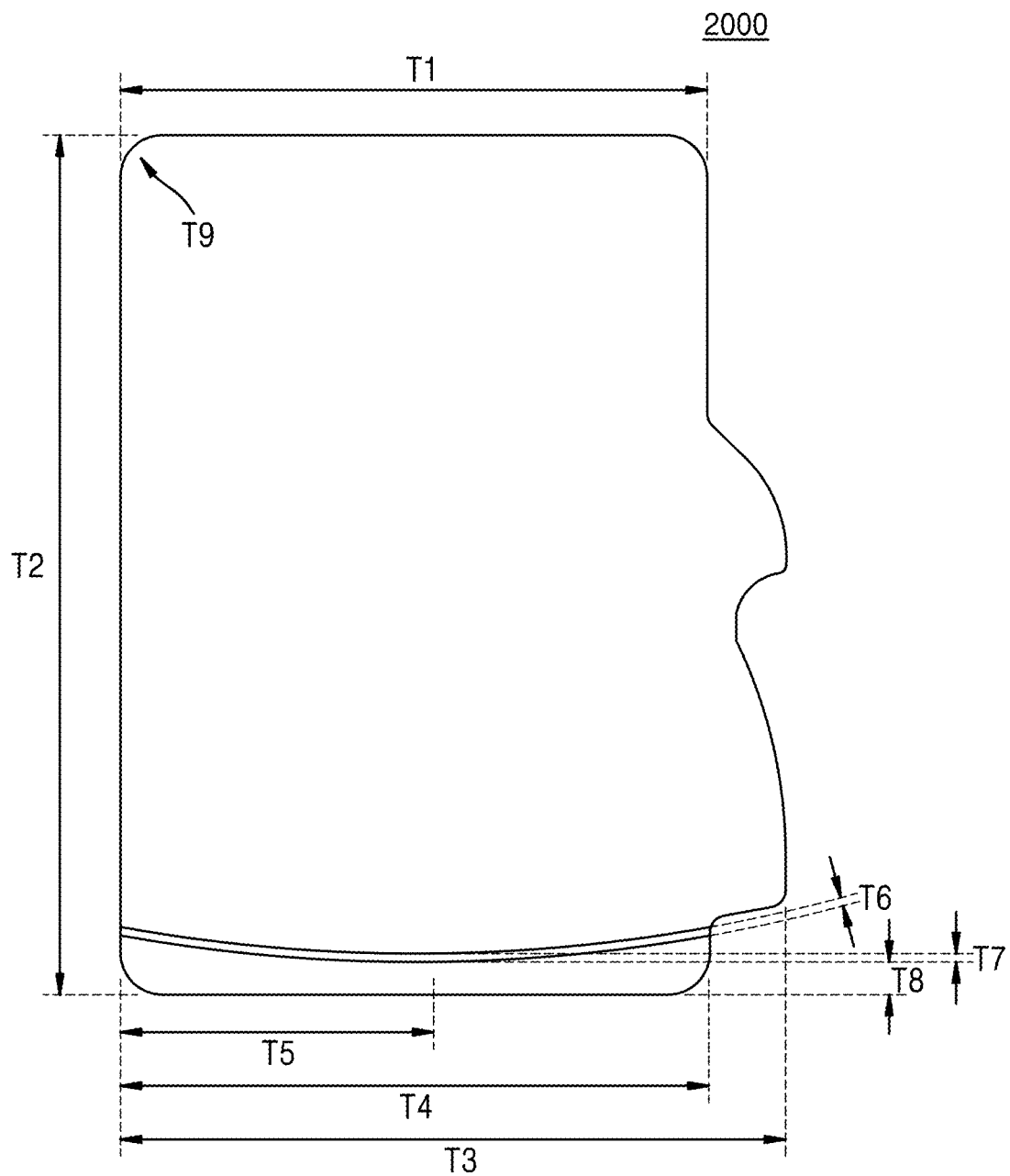
FIGS. 20A through 20C are diagrams for describing a form factor of a UFS card.
Figure 20B:
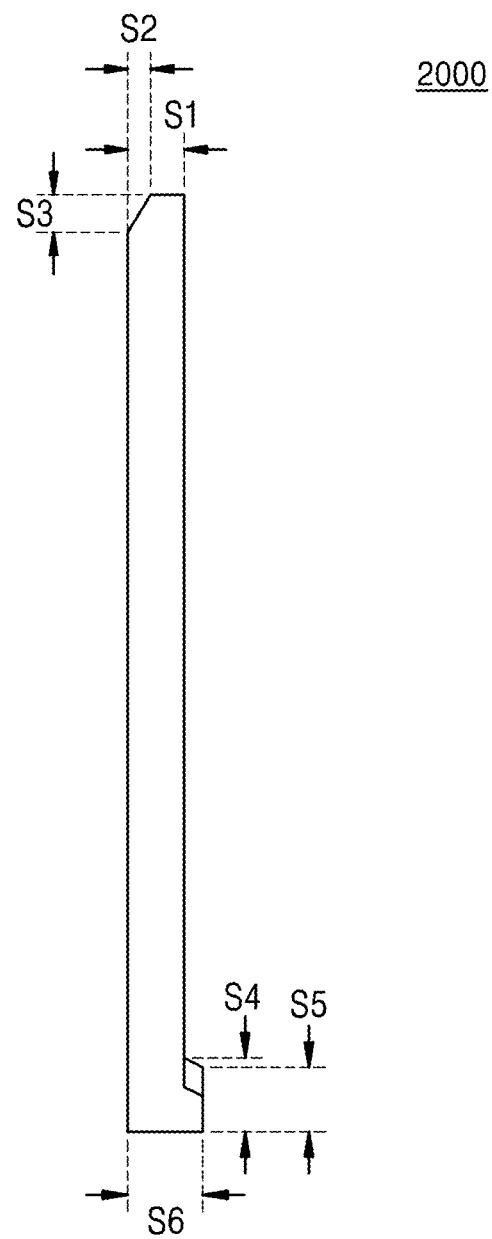
Figure 20C:
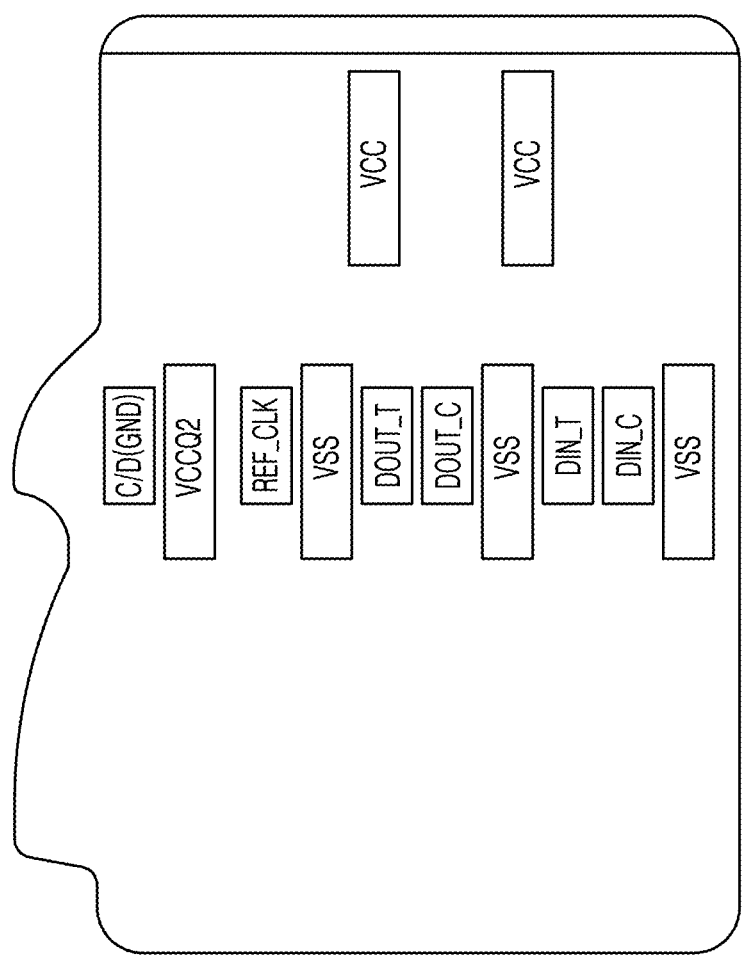

FIGS. 20A through 20C are diagrams for describing a form factor of a UFS card. When the UFS device 1200 described with reference to FIG. 19 is implemented in a form of a UFS card 2000, the outer shape of the UFS card 2000 may be as shown in FIGS. 25A through 25C.

FIG. 20A illustrates a top view of the UFS card 2000. Referring to FIG. 20A, it may be seen that the UFS card 2000 conforms to the design of a shark in general. In relation to FIG. 20A, the UFS card 2000 may have dimensions shown in Table 1.

TABLE 1

| Item | Dimension (mm) |
|------|----------------|
| T1 | 9.70 |
| T2 | 15.00 |
| T3 | 11.00 |
| T4 | 9.70 |
| T5 | 5.15 |
| T6 | 0.25 |
| T7 | 0.60 |
| T8 | 0.75 |
| T9 | R0.80 |

FIG. 20B illustrates a side view of the UFS card 2000. In relation to FIG. 20B, the UFS card 2000 may have dimensions shown in Table 2.

TABLE 2

| Item | Dimension (mm) |
|------|----------------|
| S1 | 0.74 ± 0.06 |
| S2 | 0.30 |
| S3 | 0.52 |
| S4 | 1.20 |
| S5 | 0.05 |
| S6 | 1.00 |

FIG. 20C illustrates a bottom view of the UFS card 2000. Referring to FIG. 20C, a plurality of pins electrically connecting to a UFS slot may be formed in the bottom of the UFS card 2000, and the function of each pin will be described below. Based on the symmetry between the top and the bottom of the UFS card 2000, some (e.g., T1 through T5 and T9) of the information about the dimensions described with reference to FIG. 20A and Table 1 may also be applied to the bottom view of the UFS card 2000 of FIG. 20C.

A plurality of pins electrically connected to a UFS host may be formed in the bottom of the UFS card 2000, and the total number of pins may be 12 according to FIG. 20C. Each of the pins may have a rectangular shape, and a signal name corresponding to each pin is shown in FIG. 20C. Table 3 may be referred to for general information about each pin.

TABLE 3

| No. | Signal name | Description | Dimension (mm) |
|-----|-------------|-------------|----------------|
| 1 | VSS | Ground (GND) | 3.00 × 0.72 ± 0.05 |
| 2 | DIN_C | Differential input signals input from a host to | 1.50 × 0.72 ± 0.05 |
| 3 | DIN_T | the UFS card 2000 (DIN_C is a negative node and DIN_T is a positive node) | |
| 4 | VSS | Same as No. 1 | 3.00 × 0.72 ± 0.05 |
| 5 | DOUT_C | Differential output signals output from the | 1.50 × 0.72 ± 0.05 |
| 6 | DOUT_T | UFS card 2000 to the host (DOUT_C is a negative node and DOUT_T is a positive node) | |
| 7 | VSS | Same as No. 1 | 3.00 × 0.72 ± 0.05 |
| 8 | REF_CLK | Reference clock signal provided from the host to the UFS card 2000 | 1.50 × 0.72 ± 0.05 |
| 9 | VCCQ2 | Supply voltage provided mainly for a PHY interface or a controller and having a lower value than VCC. | 3.00 × 0.72 ± 0.05 |
| 10 | C/D(GND) | Signal for card detection | 1.50 × 0.72 ± 0.05 |
| 11 | VSS | Same as No. 1 | 3.00 × 0.80 ± 0.05 |
| 12 | VCC | Main supply voltage | |

Example embodiments are not necessarily mutually exclusive. For example, some example embodiments may include one or more features described with reference to one or more figures and may also include one or more other features described with reference to one or more other figures.

Additionally, the host controller 110, device controller 210, debugging logger 212, command parser 213, response generator 214, data transfer manager 215, device driver 111, debugging manager, 112, command generator 113, response parser 114, data transfer manager 115, FTL 216, and/or the components included therein may include processor(s) and/or processing circuitry such as hardware including logic circuits; a hardware/software combination such as a processor executing software; or a combination thereof. For example, the processor(s) and/or processing circuitry may include, but is not limited to, a central processing unit (CPU), a memory controller, an arithmetic logic unit (ALU), a digital signal processor, a microcomputer, a field programmable gate array (FPGA), and programmable logic unit, a microprocessor, application-specific integrated circuit (ASIC), etc.

Processor(s), controller(s), and/or processing circuitry may be configured to perform actions or steps by being specifically programmed to perform those action or steps (such as with an FPGA or ASIC) or may be configured to perform actions or steps by executing instructions received from a memory, or a combination thereof.

Any of the elements and/or functional blocks disclosed above may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processing circuitry may include electrical components such as at least one of transistors, resistors, capacitors, etc. The processing circuitry may include electrical components such as logic gates including at least one of AND gates, OR gates, NAND gates, NOT gates, etc While the inventive concepts have been particularly shown and described with reference to example embodiments thereof, it will be understood that various changes in form and details may be made therein without departing from the spirit and scope of the following claims.

What is claimed is:

1. A storage device comprising:
a non-volatile memory;
an interconnect configured to
exchange data with a host,
receive a logging target setting request and a logging period setting request with respect to debugging information from the host,
receive a debugging information logging request from the host, and
receive a debugging information read request from the host; and
a device controller including a buffer memory, the device controller configured to
control the non-volatile memory to write the data in the non-volatile memory or read the data from the non-volatile memory,
control a logging operation on debugging information in the buffer memory, based on a logging target indicated by the logging target setting request and a logging period indicated by the logging period setting request, in response to the debugging information logging request,
wherein the logging operation comprises storing information about the logging target during each occurrence of the logging period as logged debugging information in the buffer memory, and
transmit the logged debugging information stored in the buffer memory to the host in response to the debugging read request.

2. The storage device of claim 1, wherein the device controller is further configured to
back up the logged debugging information to the non-volatile memory in response to an event occurring, and
transmit the logged debugging information backed up to the non-volatile memory to the host in response to the debugging information read request.

3. The storage device of claim 1, wherein
the debugging information includes a command history record,
the debugging information logging request indicates to set a flag corresponding to the command history record,
the interconnect is further configured to receive at least one command from the host after receiving the debugging information logging request, and
the device controller is further configured to log a reception record of the at least one command in the buffer memory as the logged debugging information.

4. The storage device of claim 3, wherein
the non-volatile memory or the buffer memory stores a first descriptor including information about whether a command history record feature is supported,
the interconnect is further configured to receive a query request querying for the descriptor from the host in an initialization or idle period of the storage device, and
the device controller is further configured to transmit a query response to the host in response to the query request, the query response including at least part of the descriptor.

5. The storage device of claim 3, wherein
the non-volatile memory or the buffer memory stores a descriptor including information about a maximum size of a command history buffer corresponding to the command history record,
the interconnect is further configured to receive a query request querying for the descriptor from the host in an initialization or idle period of the storage device, and
the device controller is further configured to transmit a query response to the host in response to the query request, the query response including at least part of the descriptor.

6. The storage device of claim 3, wherein
the interconnect is further configured to receive, from the host, a third query request setting time information, and
the device controller is further configured to include the time information set by the host in the command history record in response to the query request.

7. The storage device of claim 1, wherein
the logging target setting request writes a first attribute corresponding to the logging target or sets a first flag, a first descriptor, or a first mode page corresponding to the logging target, and
the logging period setting request indicates to write a second attribute corresponding to the logging period or sets a second flag, a second descriptor, or a second mode page corresponding to the logging period.

8. The storage device of claim 1, wherein
the logging target corresponds to a write booster flush status, and
a logging time according to the logging period corresponds to a status change time of the write booster flush status.

9. The storage device of claim 1, wherein
the logging target corresponds to a temperature notification, and
a logging time according to the logging period corresponds to a set time period.

10. The storage device of claim 1, wherein
the debugging information includes a device status record, and
the debugging information logging request indicates to set a flag corresponding to the device status record.

11. The storage device of claim 10, wherein
the non-volatile memory or the buffer memory stores a descriptor including information about whether a device status record feature is supported,
the interconnect is further configured to receive a query request querying for the descriptor from the host in an initialization or idle period of the storage device, and
the device controller is further configured to transmit a query response to the host in response to the query request, the query response including at least part of the descriptor.

12. The storage device of claim 10, wherein
the non-volatile memory or the buffer memory stores a descriptor including information about a maximum size of a device status buffer corresponding to the device status record,
the interconnect is further configured to receive a query request querying for the descriptor from the host in an initialization or idle period of the storage device, and
the device controller is further configured to transmit a query response to the host in response to the second query request, the query response including at least part of the descriptor.

13. The storage device of claim 1, wherein the storage device is a universal flash storage (UFS) device connected to the host according to a UFS standard.

14. The storage device of claim 1, wherein the device controller is further configured to:
determine whether an event occurs,
log the debugging information in the buffer memory, when no event occurs, and
back up the debugging information to the non-volatile memory, when the event occurs.

15. The storage device of claim 14, wherein the event includes at least one of reception of a task about request from the host and a reset of the storage device.

16. The storage device of claim 14, wherein the device controller is further configured to:
transmit the debugging information stored in the buffer memory to the host, in response to the debugging information read request instructing the buffer memory, and
transmit the debugging information stored in the non-volatile memory to the host, in response to the debugging information read request instructing the non-volatile memory.

17. An operating method of a storage device, the operating method comprising:
receiving a debugging information logging request from a host, the debugging information logging request requesting to start a command history record operation;
starting a debugging information logging operation with respect to a command history record in response to the debugging information logging request;
receiving a command from the host;
logging the command history record in a buffer memory of the storage device in response to the command;
receiving a task abort request from the host;
backing up the command history record logged in the buffer memory, to a non-volatile memory of the storage device, in response to the task abort request;
receiving a debugging information read request from the host; and
transmitting the command history record logged in the buffer memory or the command history record backed up in the non-volatile memory to the host in response to the debugging information read request, and
before the receiving of the debugging information logging request
receiving a first query request querying for a first descriptor from the host, the first descriptor including information about whether a command history record feature is supported, and
transmitting a first query response to the host in response to the first query request, the first query response including at least part of the first descriptor.

18. The operating method of claim 17, wherein the receiving of the debugging information logging request includes receiving a second query request indicating to set a flag corresponding to the command history record.

19. An operating method of a storage device, the operating method comprising:
receiving a logging target setting request and a logging period setting request from a host;
setting a logging target in response to the logging target setting request;
setting a logging period in response to the logging period setting request;
receiving a debugging information logging request from the host, the debugging information logging request starting a device status record operation;
controlling a debugging information logging operation with respect to log a device status record in the storage device in response to the debugging information logging request,
wherein the device status record comprises information about the logging target during each occurrence of the logging period;
receiving a debugging information read request from the host; and
transmitting the device status record logged in the storage device to the host in response to the debugging information read request.

20. The operating method of claim 19, wherein the receiving of the debugging information logging request includes receiving a query request setting a flag corresponding to the device status record.

* * * * *